(12) United States Patent
Kwon et al.

(10) Patent No.: US 11,085,651 B2
(45) Date of Patent: Aug. 10, 2021

(54) AIR CONDITIONER

(71) Applicant: Samsung Electronics Co., Ltd., Suwon-si (KR)

(72) Inventors: Junseok Kwon, Suwon-si (KR); Sunhee Son, Suwon-si (KR); Youngtae Song, Suwon-si (KR); Wonhee Lee, Suwon-si (KR); Seoyoung Cho, Suwon-si (KR); Sunghyun Chun, Suwon-si (KR); Byungghun Kim, Suwon-si (KR); Hyunggeun Park, Suwon-si (KR); Wooseog Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 16/222,393

(22) Filed: Dec. 17, 2018

(65) Prior Publication Data

US 2019/0212017 A1 Jul. 11, 2019

(30) Foreign Application Priority Data

Jan. 9, 2018 (KR) .................. 10-2018-0002622

(51) Int. Cl.
*F24F 1/0014* (2019.01)
*F24F 1/06* (2011.01)
(Continued)

(52) U.S. Cl.
CPC .......... *F24F 1/0014* (2013.01); *F24F 1/0018* (2013.01); *F24F 1/06* (2013.01); *F24F 1/005* (2019.02)

(58) Field of Classification Search
CPC .......... F24F 1/0014; F24F 1/0018; F24F 1/06; F24F 1/005
See application file for complete search history.

(56) References Cited

U.S. PATENT DOCUMENTS 5,194,043 A 3/1993 Takahashi et al.
2012/0171948 A1* 7/2012 Yamazaki ............. F24F 1/0011
454/313

(Continued)

FOREIGN PATENT DOCUMENTS

CN 104566981 A 4/2015
CN 104697146 A 6/2015
(Continued)

OTHER PUBLICATIONS

JP-2016099032-A translation.*
(Continued)

*Primary Examiner* — Elizabeth J Martin
(74) *Attorney, Agent, or Firm* — Jefferson IP Law, LLP

(57) ABSTRACT

An air conditioner is provided. The air conditioner includes a housing, a heat exchanger positioned inside the housing, a fan for blowing air into the heat exchanger such that heat in the blown air is exchanged with the heat exchanger, a duct including a first channel forming surface, and a second channel forming surface, a porous panel corresponding to the second channel forming surface, and including a plurality of pores, a blade for swiveling between an open position and a closed position, blocking the low wind-speed channel at the open position so that air passed through the basic channel can be discharged outside of the air conditioner, moving the air passed through the basic channel to the low wind-speed channel, and discharging the air to the outside via the pores at the closed position, a driver for driving the blade to swivel, and a processor configured to control the driver.

20 Claims, 27 Drawing Sheets

(51) Int. Cl.
F24F 1/0018 (2019.01)
F24F 1/005 (2019.01)

(56) References Cited

U.S. PATENT DOCUMENTS

| | | | |
|---|---|---|---|
| 2012/0216985 A1* | 8/2012 | Tai | F24F 1/005 165/59 |
| 2017/0159947 A1 | 6/2017 | Jeon et al. | |
| 2019/0017711 A1 | 1/2019 | Jung et al. | |

FOREIGN PATENT DOCUMENTS

| | | | |
|---|---|---|---|
| CN | 206160408 U | | 5/2017 |
| GB | H05-180503 A | | 7/1993 |
| JP | 2016099032 A | * | 5/2016 |
| JP | 2016099032 A | | 5/2016 |
| KR | 10-2012-0022248 A | | 3/2012 |
| KR | 20140101284 A | | 8/2014 |
| KR | 10-2017-0009701 A | | 1/2017 |
| KR | 10-1698842 B1 | | 1/2017 |
| KR | 10-2017-0043908 A | | 4/2017 |
| KR | 10-2017-0082849 A | | 7/2017 |

OTHER PUBLICATIONS

International Search Report dated Apr. 17, 2019, issued in an International application No. PCT/KR2018/016174.
European Search Report dated Jan. 11, 2021, issued in European Application No. 18899441.2.
Chinese Office Action dated May 21, 2021, issued in Chinese Patent Application No. 201910007729.4.

* cited by examiner

AIR CONDITIONER

CROSS-REFERENCE TO RELATED APPLICATION(S)

This application is based on and claims priority under 35 U.S.C. § 119 of a Korean patent application number 10-2018-0002622, filed on Jan. 9, 2018, in the Korean Intellectual Property Office, the disclosure of which is incorporated by reference herein in its entirety.

BACKGROUND

1. Field

The disclosure relates to an air conditioner and a method of controlling the same. More particularly, the disclosure relates to an air conditioner having a simple structure for making low wind-speed airflow and direct wind airflow.

2. Description of Related Art

An air conditioner employs a refrigeration cycle for adjusting temperature, humidity, airflow, distribution, etc. suitable to human life while filtering out dust or the like from air. In the air conditioner separated into an indoor unit and an outdoor unit, the indoor unit includes a heat exchanger for exchanging heat with air inhaled into the air conditioner, and a fan for inhaling indoor air into the air conditioner and sending the inhaled air to the outside of the air conditioner.

In an air conditioner of the related art, the indoor unit is generally provided to form airflow in a direction from back to front by the fan. In other words, the heat exchanger and the fan are placed inside a channel structure, and cooling airflow is discharged to an indoor space through an outlet positioned at the end of the channel, thereby having cooling effects.

The indoor unit of the air conditioner of the related art has a structure of generating strong airflow through the fan and directly discharging to a room or a user through the outlet so as to overcome a pressure drop in the heat exchanger and have a sufficient cooling effect. However, a user may feel displeasure when s/he directly contacts the strong airflow having a temperature excessively lower than a body temperature.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an air conditioner for making low wind-speed cooling airflow to avoid displeasure caused by direct contact with cooling airflow.

Another aspect of the disclosure is to provide an air conditioner having a simple structure for switching over between low wind-speed the cooling airflow and direct wind cooling airflow.

Another aspect of the disclosure is to provide an air conditioner having a simple structure for controlling direct wind airflow in left and right directions and forming an outer appearance of the air conditioner.

Additional aspects will be set forth in part in the description which follows and, in part, will be apparent from the description, or may be learned by practice of the presented embodiments.

In accordance with an aspect of the disclosure, an air conditioner is provided. The air conditioner includes a housing, a heat exchanger positioned inside the housing, a fan for blowing air into the heat exchanger, such that the heat exchanger exchanges heat with the blown air, at least one duct which includes a first channel forming surface which forms a basic channel for guiding the blown air, and a second channel forming surface which forms a low wind-speed channel extended from the basic channel, a porous panel corresponding to the second channel forming surface, the porous panel including a plurality of pores, a blade for swiveling between an open position and a closed position, blocking the low wind-speed channel at the open position so that air passed through the basic channel can be discharged to an outside, moving the air passed through the basic channel to the low wind-speed channel, and discharging the air to the outside via the pores at the closed position, a driver which drives the blade to swivel, and at least one processor configured to control the driver.

Thus, the low wind-speed cooling airflow can avoid direct contact with a user with the cooling airflow, which may be unpleasant to the user. Further, a simple structure may be sufficient to switch over between low wind-speed the cooling airflow and direct wind cooling airflow.

The porous panel may include a first porous panel and a second porous panel space apart at a predetermined distance from each other to form a direct-wind outlet so that the air passed through the basic channel can be discharged to the outside at the open position of the blade.

The fan may be deviated from a center of the air conditioner, and the blade may be swiveled to an area opposite to the deviation.

The blade may include a plate-shaped outer member which swivels between the open position and the closed position so that the air passed through the basic channel can be discharged in a first direction or a second direction different from the first direction in accordance with swiveled angles at the open position.

The blade may direct the air to be discharged through a direct-wind outlet at the open position, and direct the air, in accordance with swiveled angles at the open position, be discharged in the first direction by avoiding the outer member from a channel between the basic channel and the direct-wind outlet, and direct the air flowing in the first direction be curved and discharged in the second direction by intervening the outer member in the channel between the basic channel and the direct-wind outlet.

Thus, it is possible to not only switch over between the low wind-speed airflow and the direct wind airflow but also control left and right directions of the direct wind airflow.

The blade may include an inner member with a pair of guides spaced apart from each other, and the air passed through the basic channel may be discharged in the first direction or the second direction while passing through a channel formed by the pair of guides, in accordance with swiveled angles at the open position.

Thus, the blade may be used to more precisely control the direction of the airflow.

The outer member and the inner member of the blade may be formed as a single body.

Thus, there are effects on simplifying the structure and reducing the costs.

The channel formed by the pair of guides of the inner member at the closed position may be formed between the basic channel and the low wind-speed channel.

Thus, the guides of the inner member may make a smoother connection between the basic channel and the low wind-speed channel.

The outer member and the inner member of the blade at the open position may form a predetermined angle so that the outer member can block the low wind-speed channel and the inner member can serve as a guide in the second direction.

Thus, it is possible to not only switch over between the low wind-speed airflow and the direct wind airflow but also control left and right directions of the direct wind airflow, even though the outer member and the inner member are integrally swiveled when the blade swivels since the outer member and the inner member of the blade are formed as the single body.

The blade may be provided including the inner member of which the guide close to the outer member among the pair of guides is shorter than or equal to a predetermined length.

Thus, when the blade is at the closed position, the inner member does not interfere with the low wind-speed channel so that the blown air can be smoothly moved to the low wind-speed channel even though the blade includes the inner member.

In accordance with another aspect of the disclosure, an air conditioner is provided. The air conditioner includes a housing, a heat exchanger positioned inside the housing, a fan for blowing air into the heat exchanger, such that the heat exchanger exchanges heat with the blown air, at least one duct including a first channel forming surface forming a basic channel for guiding the blown air, and a second channel forming surface forming a low wind-speed channel extended from the basic channel, and a porous panel corresponding to the second channel forming surface, the porous panel including a plurality of pores, wherein the first channel forming surface of the duct orients the basic channel toward a center of the air conditioner, and wherein the second channel forming surface of the duct orients the low wind-speed channel be extended from the basic channel toward at least one side of the air conditioner.

The air conditioner may further include a blade which can be swiveled between an open position and a closed position, wherein the blade is configured to block the low wind-speed channel at the open position so that air passed through the basic channel can be discharged to an outside, move the air passed through the basic channel to move to the low wind-speed channel, and discharge the air to the outside via the plurality of pores at the closed position.

The air conditioner may further include a driver which drives the blade to swivel, and at least one processor to control the driver The fan may be deviated from a center of the air conditioner, and the blade may be swiveled to an area opposite to the deviation.

The blade may be swiveled between the open position and the closed position, and the blade may include a plate-shaped outer member so that the air passed through the basic channel can be discharged in a first direction or a second direction different from the first direction in accordance with swiveled angles at the open position.

The blade may include an inner member having a pair of guides spaced apart from each other, and the air passed through the basic channel may be discharged in the first direction or the second direction while passing through a channel formed by the pair of guides, in accordance with swiveled angles at the open position.

The outer member and the inner member of the blade may be formed as a single body.

The outer member and the inner member of the blade at the closed position may form a predetermined angle so that at least one of the pair of guides of the inner member can be positioned at a center of the basic channel.

As described above, according to the disclosure, a feeling of better airflow is given by avoiding displeasure caused by direct contact with cooling airflow.

Further, according to the disclosure, a simple structure is enough to not only switch over between low wind-speed airflow and direct wind airflow but also control direct wind airflow in left and right directions, thereby having structure simplification and cost reduction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the embodiments of the disclosure, terms with 'first,' 'second' and the like ordinal number are used only for distinguishing one element from another element, and a singular expression includes a plural expression unless it clearly gives a contextually different meaning. Further, in the embodiments of the disclosure, "comprise," "include," "have," and the like expressions shall be construed not to exclude presence or addition of one or more other features or numerical values, steps, operations, elements, parts or combination thereof. Further, in the embodiments of the disclosure, at least one among plural elements refers to not only all the elements but also each individual one or combination thereof excluding the others among the plurality of elements.

Figure 1:
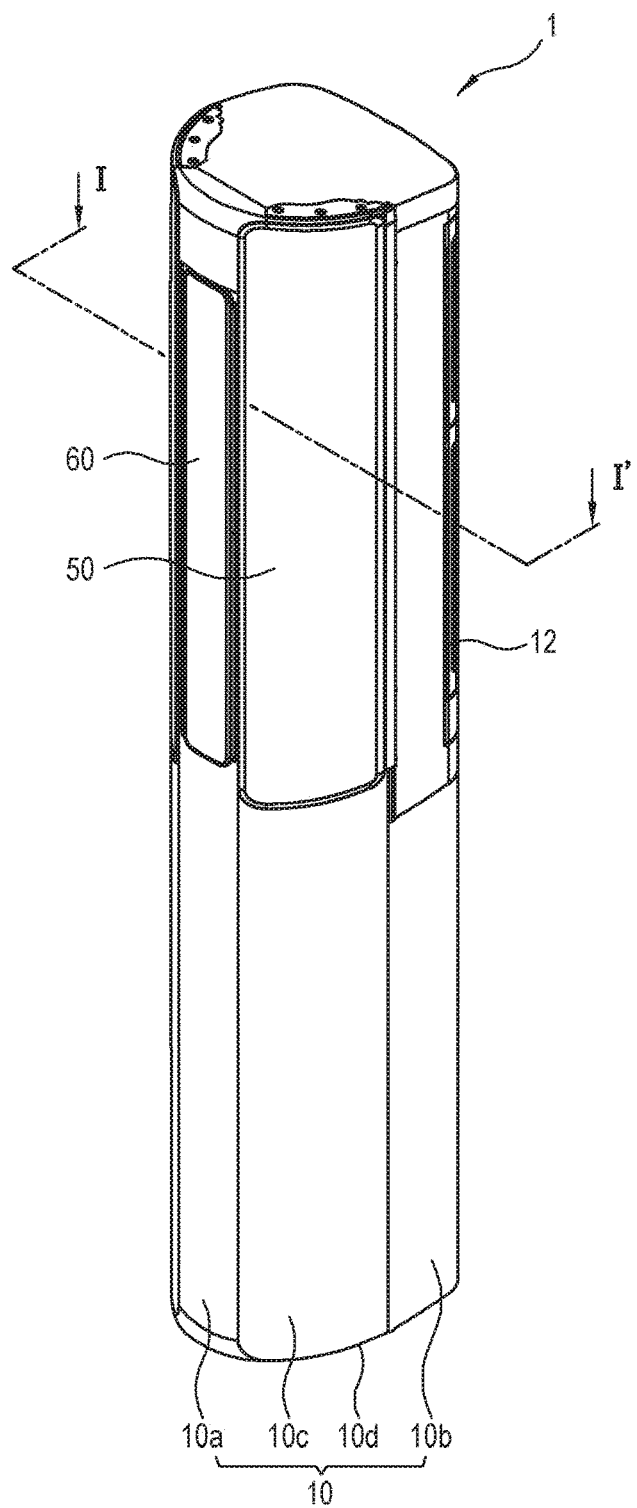
FIG. 1 is a perspective view of an air conditioner according to an embodiment of the disclosure.
Figure 2:
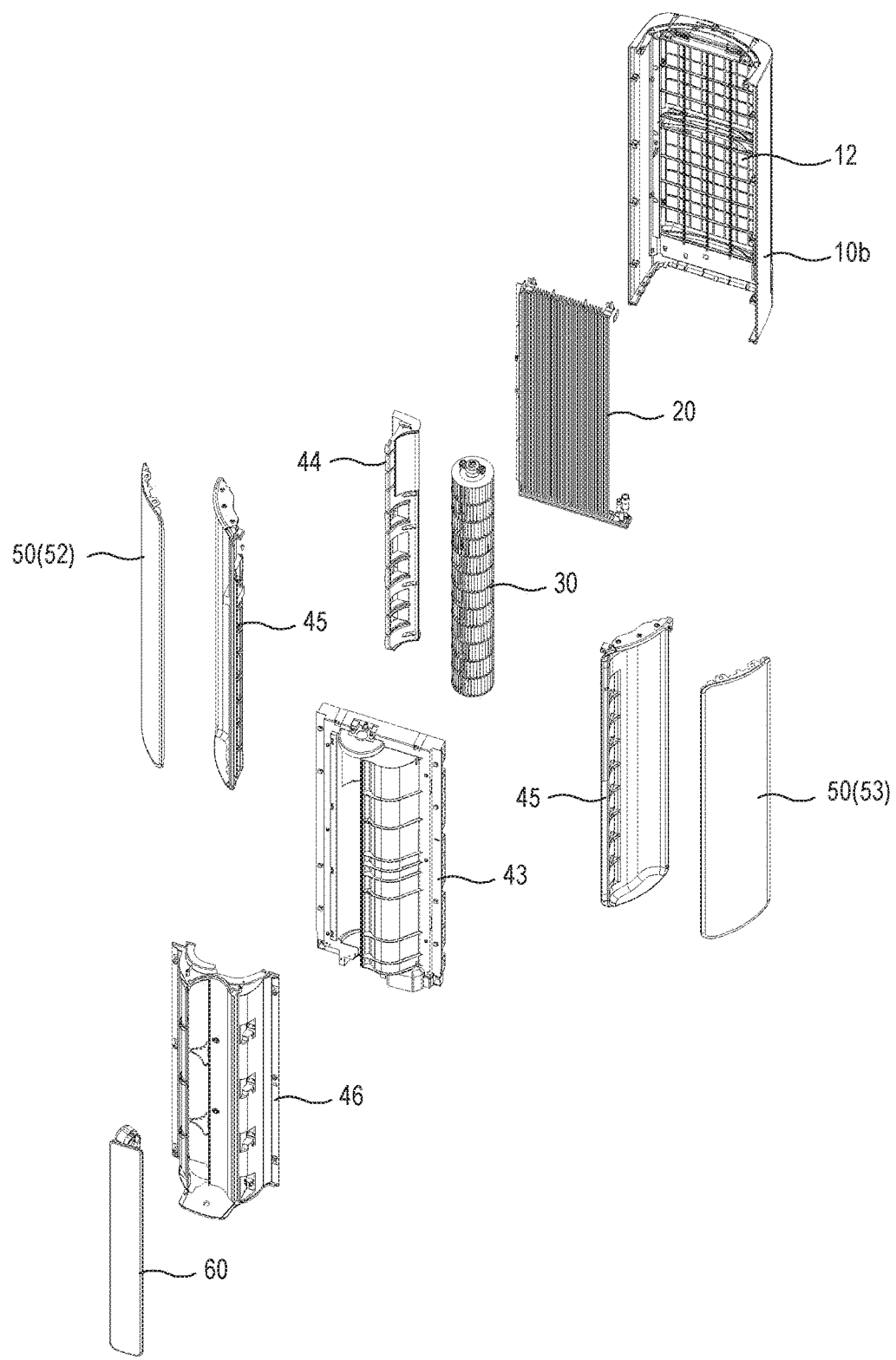
FIG. 2 is an exploded perspective view of the air conditioner according to an embodiment of the disclosure.

FIG. 1 is a perspective view of an air conditioner 1 according to an embodiment of the disclosure, and FIG. 2 is an exploded perspective view of the air conditioner 1 according to an embodiment of the disclosure.

Referring to FIG. 1, the air conditioner 1 includes a housing 10, a heat exchanger 20, a fan 30, a duct 40, a porous panel 50, a blade 60, a driver configured to swivel the blade, and a controller configured to control the driver.

The housing 10 forms an outer appearance of the air conditioner 1. The housing 10 includes a front panel 10a arranged in a front of the air conditioner 1, a rear panel 10b arranged behind the front panel 10a, a lateral panel 10c arranged between the front panel 10a and the rear panel 10b, and a top panel and a bottom panel 10d arranged on a top and a bottom of the lateral panel 10c.

The housing 10 may include at least one direct-wind outlet 11 through which air is discharged from the inside of the air conditioner 1 to the outside. For example, the front panel 10a may be formed with a rectangular direct-wind outlet 11. The rear panel 10b may be formed with an inhaler 12 through which external air is inhaled into the housing 10. However, the direct-wind outlet 11 and the inhaler 12 are limited to such positions or shapes.

The inhaler 12 is provided on the rear panel 10b arranged in the rear of the heat exchanger 20 and guides air outside the housing 10 to be introduced into the housing 10. The heat of the air introduced into the housing 10 through the inhaler 12 is absorbed in and lost by the heat exchanger 20 while the air passes through the heat exchanger 20. The air, heat of which is exchanged with the heat exchanger 20 while passing through the heat exchanger 20, is discharged to the outside of the housing 10 by the fan 30.

The heat exchanger 20 is placed inside the housing 10 and exchanges heat with the air introduced into the housing 10. The heat exchanger 20 is arranged between the fan 30 and the inhaler 12, thereby absorbing heat from the air introduced through the inhaler 12, or transferring heat to the air introduced through the inhaler 12. The heat exchanger 20 may include a tube, and a header coupled to the top and bottom sides of the tube. However, there are no limits to the kind (or type) of heat exchanger 20 that may be used.

The fan 30 blows out the air of which heat is exchanged with the heat exchanger 20. The fan 30 may be materialized by a cross flow fan. However, the fan 30 is not limited to this type fan, but may be materialized as any type fan such as a mixed flow fan, a turbo fan, a sirocco fan or the like capable of making the air introduced from the outside of the housing flow to the outside of the housing. There are no limits to the number of fans 30. For example, at least one fan 30 may be provided corresponding to at least one direct-wind outlet. The fan 30 is placed in front of the inhaler 12, and the heat exchanger 20 may be placed between the fan 30 and the inhaler 12. The direct-wind outlet 11 may be placed in front of the fan 30. The fan 30 may be provided with a fan driver for driving the fan. The fan driver may include a motor.

The duct 40 guides the air blown by the fan 30. The duct 40 may include a first channel forming surface 41 for forming a basic channel A for guiding the blown air, and a second channel forming surface 42 for forming a low wind-speed channel B extended from the basic channel A. Here, the basic channel A refers to at least a portion of a path via which the air blown by the fan 30 and discharged to the outside of the air conditioner 1 through the direct-wind outlet 11 flows. The low wind-speed channel B refers to at least a portion of a path which is extended from the basic channel A and via which air discharged to the outside of the air conditioner 1 flows through pores 51 of the porous panel 50. Details of the basic channel A and the low wind-speed channel B will be described later.

There are no limits to the number of ducts 40. In other words, a single duct may be provided, and two or more ducts may be provided. For example, the duct 40 may include a front duct 43 positioned between the fan 30 and the front panel 10a of the housing, a lateral duct 44 positioned at a lateral side of the fan 30, and a panel duct 45 positioned in the back of the porous panel 50. However, the number and kind of ducts 40 are not limited to this example.

The first channel forming surface 41 for forming the basic channel A and the second channel forming surface 42 for forming the low wind-speed channel B may be provided in one duct, may be respectively provided in two ducts, or may be at least partially divisionally provided in two or more ducts. For example, the first channel forming surface 41 may be provided in the front duct 43, and the second channel forming surface 42 may be provided in the panel duct 45. However, the first and second channel forming surfaces and the duct having the same are not limited to this example.

The first channel forming surface 41 of the duct 40 may be provided so that the basic channel A can be oriented toward the center of the air conditioner 1. Further, the second channel forming surface 42 of the duct 40 may be provided so that the low wind-speed channel B can be extended from the basic channel A and oriented toward at least one side of the air conditioner 1. For example, when the first channel forming surface 41 is provided making the basic channel A be oriented toward the center of the air conditioner 1, the second channel forming surface 42 may be provided making the low wind-speed channel B be extended from the basic channel A and oriented toward the left and right sides of the air conditioner 1. However, the first channel forming surface 41 and the second channel forming surface 42 and the basic channel A and the low wind-speed channel B provided corresponding thereto are not limited to these positions and shapes.

The duct 40 may have a supporting structure. For example, the duct 40 may include a duct stabilizer 46 positioned in front of the front duct 43 and supporting the front duct 43.

The porous panel 50 includes a plurality of pores 51 formed penetrating the inner and outer surfaces of the porous panel.

The porous panel 50 is provided corresponding to the second channel forming surface 42 for forming the low wind-speed channel B. Therefore, the air passed through the low wind-speed channel B is discharged to the outside of the air conditioner 1 through the porous panel 50. As compared with the air blown by the fan 30 and discharged to the outside through the direct-wind outlet 11, the air blown and discharged to the outside through the pores 51 of the porous panel 50 is lowered in speed. Further, when the air is discharged to the outside through the pores 51 of the porous panel 50, for example, when the blade 60 to be described below is positioned at a closed position 200, the rotating speed of the fan 30 is relatively lowered as compared with that of when the blade 60 is positioned at an open position 100, thereby further lowering the wind speed of the air discharged to the outside through the pores 51 of the porous panel 50 (hereinafter, airflow discharged through the pores 51 will be called 'weak wind' airflow or 'low wind-speed' airflow, and airflow discharged through the direct-wind outlet 11 will be called 'direct wind'). Thus, according to an embodiment of the disclosure, the low wind-speed cooling airflow is achieved to thereby avoid displeasure caused by direct contact with the cooling air blowing on a user.

The pores 51 may be distributed throughout the porous panel 50, or may be distributed in only a portion of the porous panel 50. In the former case, the pores 51 may be uniformly or non-uniformly distributed throughout the porous panel 50. For convenience, descriptions will be made below on the premise that the pores 51 are uniformly distributed throughout the porous panel 50.

The porous panel 50 may include a first porous panel 52 and a second porous panel 53 which are spaced apart from each other at a predetermined distance to form the direct-wind outlet 11 so that the air passed through the basic channel A can be discharged. For example, the porous panel 50 includes the first porous panel 52 and the second porous panel 53 respectively positioned at the left and right sides of the front panel 10a of the housing. The first porous panel 52 and the second porous panel 53 can be spaced apart from each other at a predetermined distance so that they together with the upper and lower portions of the housing front panel 10a can form a rectangular direct-wind outlet 11 at the center of the housing front panel 10a. However, there are no limits to the number and position of porous panels 50, and the position, shape, etc. of the direct-wind outlet 11. For example, the porous panel 50 may be arranged on at least one surface of the front, right, left, rear and top sides of the air conditioner 1. However, for convenience, descriptions will be made below on the premise that the first porous panel 52 and the second porous panel 53 are respectively positioned at the left and right sides of the housing front panel 10a, and the rectangular direct-wind outlet 11 is formed between the first porous panel 52 and the second porous panel 53 along the lengthwise direction of the air conditioner 1.

The blade 60 may include a plate-shaped outer member 61, and a support member 64 connected to the outer member 61, a swiveling shaft of the blade 60 and supporting the swiveling of the blade 60.

The blade 60 is movable between the open position 100 and the closed position 200. Here, the open position 100 refers to a position of the blade at which the direct-wind outlet 11 for outward discharging the air passed through the basic channel A is opened, and the closed position 200 refers to a position of the blade at which the direct-wind outlet 11 is closed.

There are no specific limits to a method of moving the blade 60 between the open position 100 and the closed position 200. For example, the blade 60 may be swiveled to move between the open position 100 and the closed position 200. Alternatively, the blade 60 may be straightly moved to move between the open position 100 and the closed position 200. When the blade 60 is swiveled to move between the open position 100 and the closed position 200, the blade 60 opens and closes the direct-wind outlet 11, i.e. an opening, via which the air passed through the basic channel A is discharged to the outside, while swiveling between the open position 100 and the closed position 200. On the other hand, when the blade 60 is straightly moved to move between the open position 100 and the closed position 200, the blade 60 opens and closes the direct-wind outlet 11 while straightly moving between the open position 100 and the closed position 200, for example moving forward or backward with respect to the front panel 10a.

When the blade 60 is moved to the open position 100, the blade 60 not only opens the direct-wind outlet 11 but also closes the low wind-speed channel B so that the air passed through the basic channel A can be directly discharged to the outside via the direct-wind outlet 11 without being introduced into the low wind-speed channel B.

On the other hand, when the blade 60 is moved to the closed position 200, the blade 60 closes the direct-wind outlet 11 so that the air passed through the basic channel A can move to the low wind-speed channel B and be discharged to the outside via the pores 51 of the porous panel 50, i.e. be discharged as the low wind-speed airflow. As described above, when the blade 60 is moved to the closed position 200, the rotating speed of the fan 30 may be additionally lowered to thereby further lower the speed of the air discharged to the outside via the pores 51 of the porous panel 50.

Thus, with such a simple structure, it is possible to switch over between the low wind-speed the cooling airflow and the direct wind the cooling airflow.

Here, the open position 100 and the closed position 200 may be not limited to specific positions, respectively. For example, the open position 100 may include any positions as long as the direct-wind outlet 11, i.e. the opening via which the air passed through the basic channel A is discharged to the outside is opened. Therefore, according to an embodiment of the disclosure, the open position 100 of the blade 60 in the air conditioner 1 may include a plurality of positions.

The driver for moving or swiveling the blade 60 may be materialized by a motor, but is not limited thereto. The controller for controlling the driver may be achieved by a microprocessor, but is not limited thereto.

According to an embodiment of the disclosure, the air conditioner 1 may include a user input section for receiving a user command. In this case, the controller may control the air conditioner in response to a user command input through the user input section. The user input section may be for example provided on the front panel 10a of the housing 10.

Further, according to an embodiment of the disclosure, the air conditioner 1 may include a display. In this case, the display may display an operation state of the air conditioner 1. Further, the display may be provided with the user input section by which the air conditioner 1 is controllable.

Below, it will be described that the blade 60 is swiveled between the open position 100 and the closed position 200.

Figure 3:
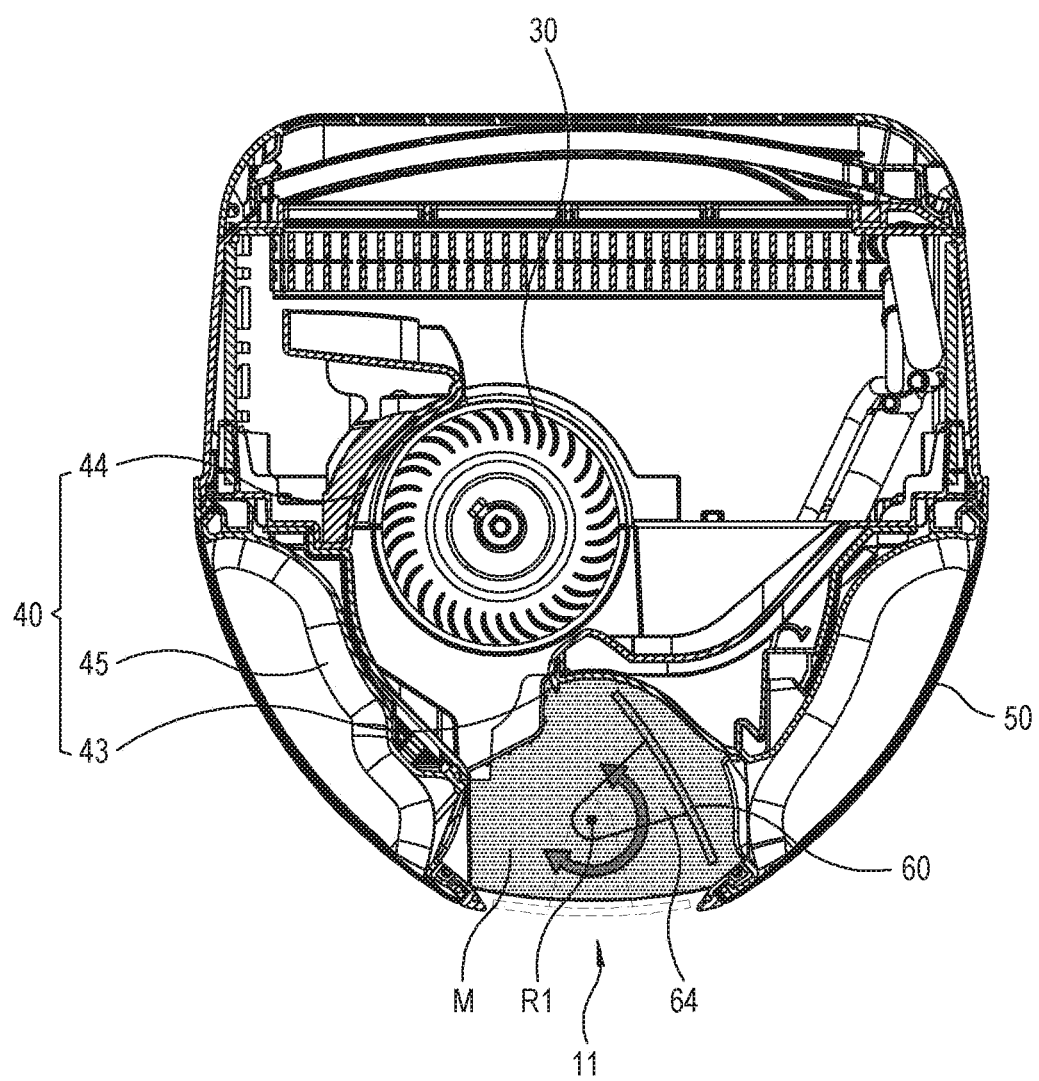
FIGS. 3, 4, and 5 are examples of showing swiveling of a blade and a corresponding channel according to various embodiments of the disclosure.
Figure 4:
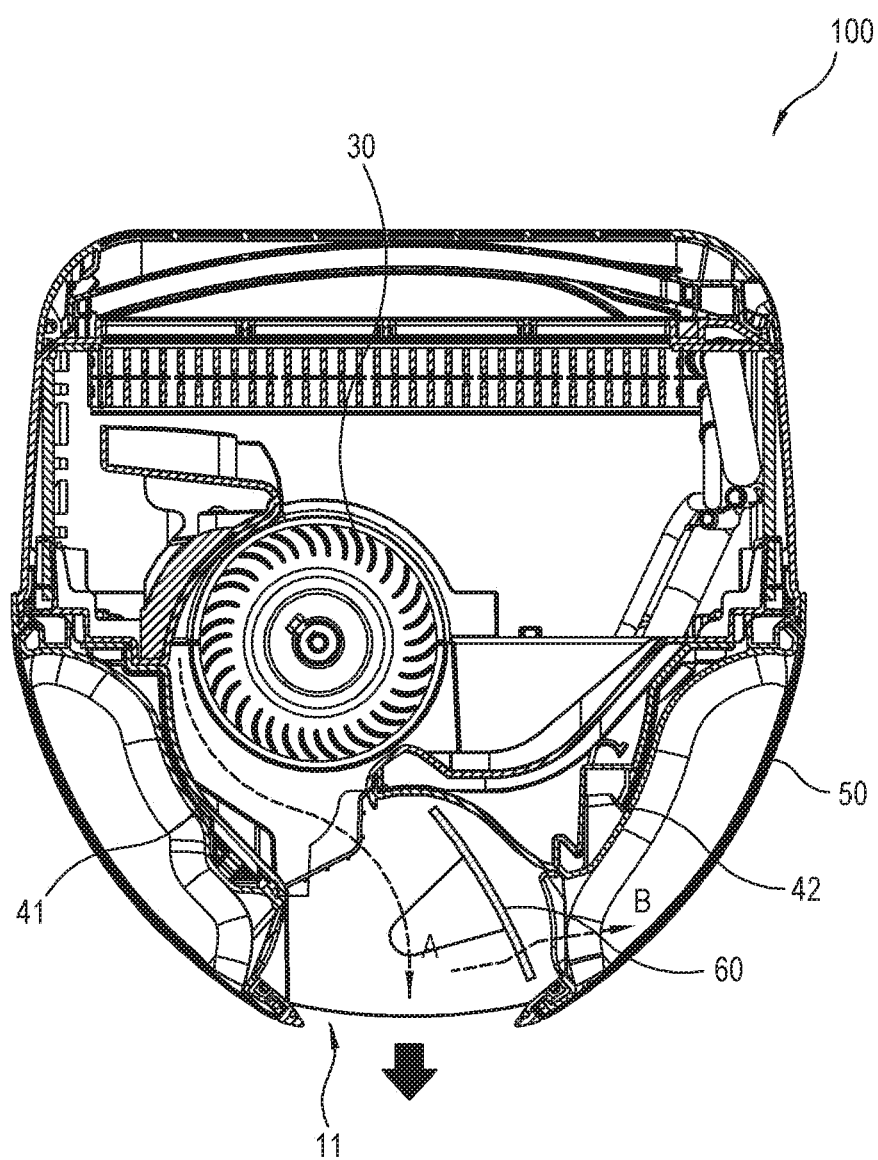
Figure 5:
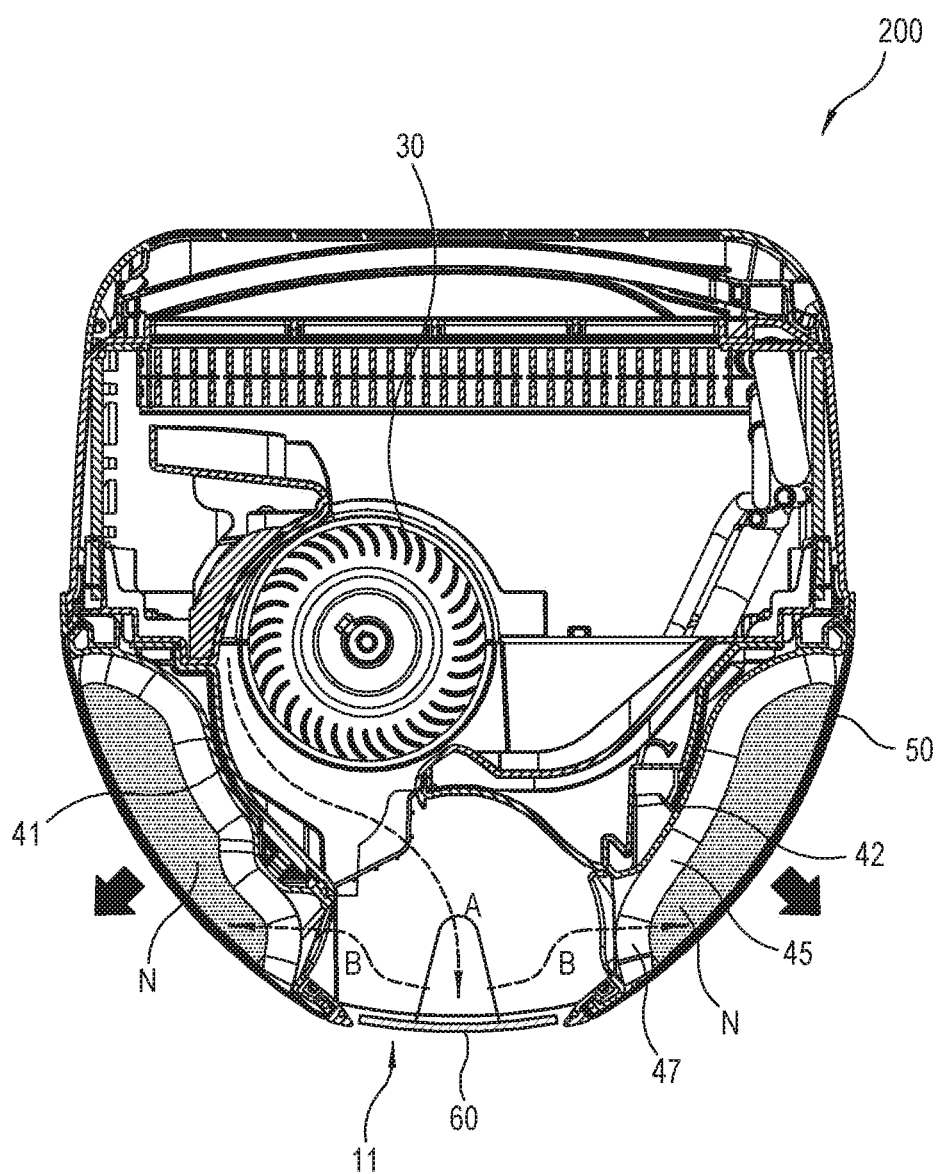

FIGS. 3 to 5 are cross-sectional views taken along line I-I' of FIG. 1, and show swiveling of the blade 60 and a corresponding channel according to various embodiments of the disclosure.

FIG. 3 shows a swiveled state of the blade 60 in the air conditioner 1 according to an embodiment of the disclosure.

The blade 60 is clockwise or counterclockwise swiveled in a space M between the duct 40 and the direct-wind outlet 11 with respect to a rotary shaft R1 oriented from one end of the support member 64 toward the lengthwise direction of the direct-wind outlet 11. As swiveled, the blade 60 may be positioned at the open position 100 or the closed position 200.

With reference to FIG. 4, it will be described that the blade 60 is at the open position 100. When the blade 60 is swiveled and moved to the open position 100, the direct-wind outlet 11, which is being blocked by the blade 60 at the closed position 200, is opened. Further, the low wind-speed channel B formed by the second channel forming surface 42 of the duct 40 and extended from the basic channel A is closed by the blade 60. Therefore, when the blade 60 is positioned at the open position 100, the air blown by the fan 30 and guided by the first channel forming surface 41 of the duct 40 to pass through the basic channel A is blocked from being introduced into the low wind-speed channel B and discharged to the outside of the air conditioner 1 via the direct-wind outlet 11.

According to an embodiment of the disclosure, the air conditioner 1 may additionally include an element for restricting a swiveled angle of the blade 60. As described above, the blade 60 blocks the low wind-speed channel B when it is at the open position 100, so that the air passed through the basic channel can be discharged to the outside of the air conditioner 1 via the direct-wind outlet 11. Therefore, when the blade 60 is swiveled up to a position where the low wind-speed channel B is not blocked any more, the function of the blade 60 is lessened in the open position 100. For example, when the blade 60 is further swiveled from the position of FIG. 4 in the counterclockwise direction, the low wind-speed channel B is not closed but rather at least partially opened.

Therefore, according to an embodiment of the disclosure, the air conditioner 1 may further include an element for restricting the swiveled angle of the blade 60, for example, a spring. However, the element for restricting the swiveled angle of the blade 60 is not limited to the spring.

With reference to FIG. 5, it will be described that the blade 60 is at the closed position 200. When the blade 60 is swiveled and moved to the closed position 200, the direct-wind outlet 11 is closed by the blade 60. Therefore, the air blown by the fan 30 and passed through the basic channel A is not discharged to the outside of the air conditioner 1 through the direct-wind outlet 11, but discharged to the outside through the pores of the porous panel 50 along the low wind-speed channel B. In this case, the panel duct 45 may be at least partially provided with a panel hole 47 for passing the air so that the air not discharged to the outside via the direct-wind outlet 11 can be introduced through the low wind-speed channel B into a space N formed by the porous panel 50 and the second channel forming surface 42.

Figure 6:
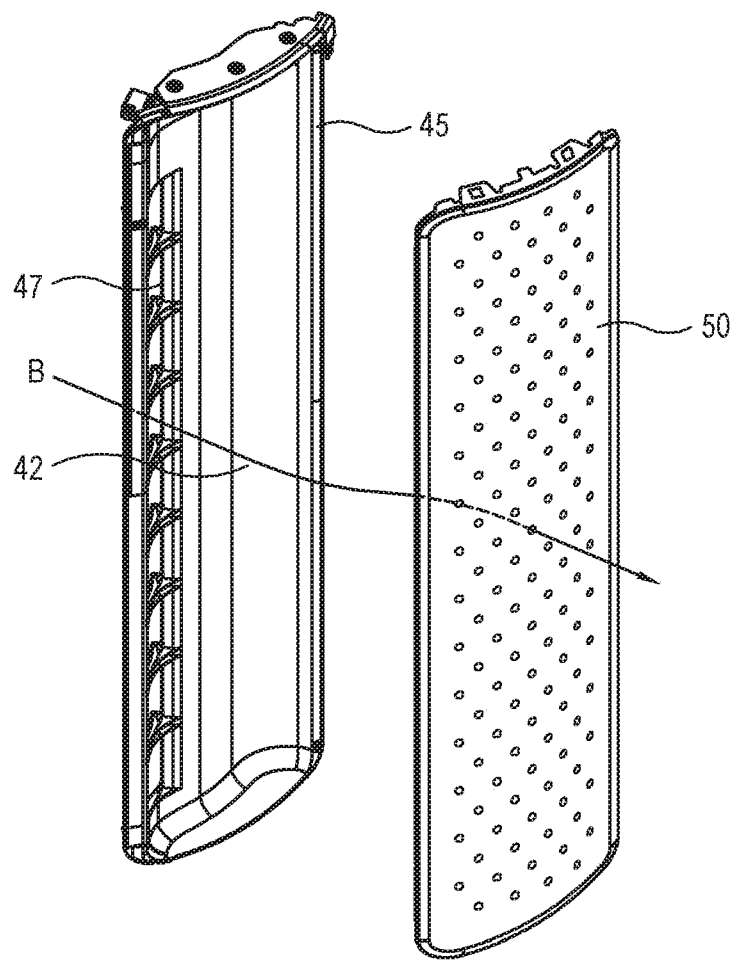
FIG. 6 is an example of a duct and a porous panel according to an embodiment of the disclosure.

With reference to FIG. 6, a path, along which the air passed through the panel hole 47 along the low wind-speed channel B is discharged to the outside through the pores 51 of the porous panel 50, will be described.

FIG. 6 shows the panel duct 45 provided with the second channel forming surface 42 in the duct 40, and the porous panel 50 corresponding thereto according to an embodiment of the disclosure.

When the blade 60 is at the closed position 200, the air passed through the basic channel A is blocked by the blade 60 and moves toward the panel duct 45 and the porous panel 50 along the low wind-speed channel B. Then, the air introduced into the space formed by the porous panel 50 and the second channel forming surface 42 via the panel hole 47 of the panel duct 45 is discharged to the outside through the pores 51 of the porous panel 50 as the air is more and more introduced into the same space and increases internal pressure.

Figure 7:
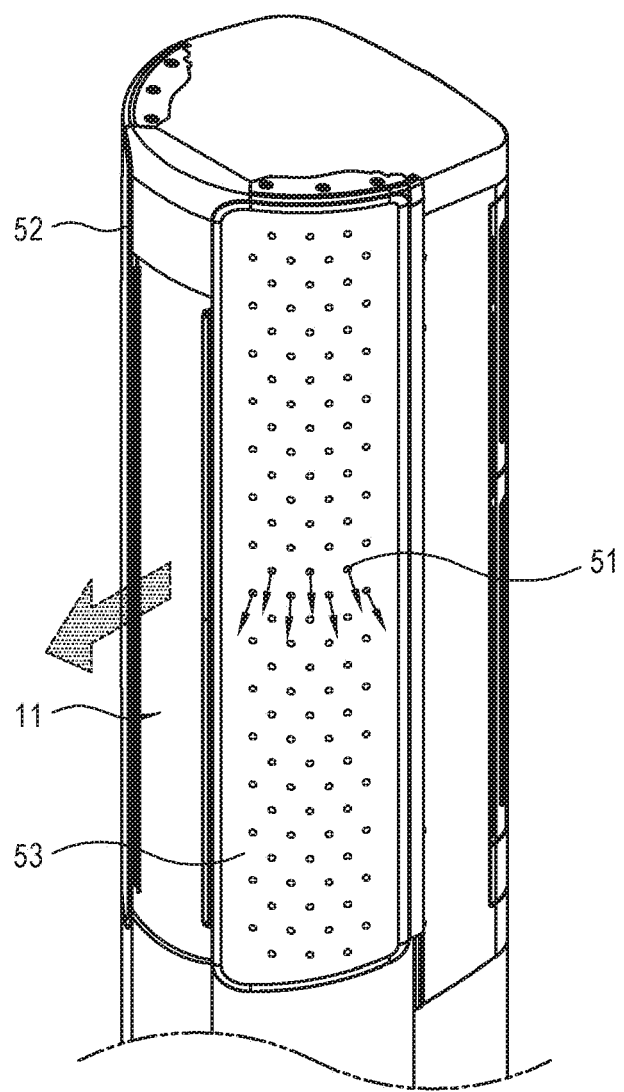
FIG. 7 illustrates that air is discharged to the outside of the air conditioner according to an embodiment of the disclosure.

FIG. 7 illustrates that air is discharged to the outside of the air conditioner 1 according to an embodiment of the disclosure, When the blade 60 is at the open position 100, the direct-wind outlet 11 is opened so that the air blown from the inside of the air conditioner 1 can be discharged to the outside through the direct-wind outlet 11. On the other hand, when the blade 60 is at the closed position 200, the direct-wind outlet 11 is closed by the blade 60 so that the air blown from the inside of the air conditioner 1 can be discharged to the outside through the porous panel 50, and in the case of FIG. 7, the outside of the air conditioner 1 through the first porous panel 52 and the second porous panel 53 positioned at the lateral sides of the direct-wind outlet 11. As compared with the blown air directly discharged through the opening, i.e. the direct-wind outlet 11 without any other obstacles, the air discharged through the pores 51 of the porous panel 50 is lowered in wind-speed. Further, the rotating speed of the fan 30 is also lowered to thereby additionally lower the wind speed of the air discharged through the pores 51 of the porous panel 50.

Figure 8:
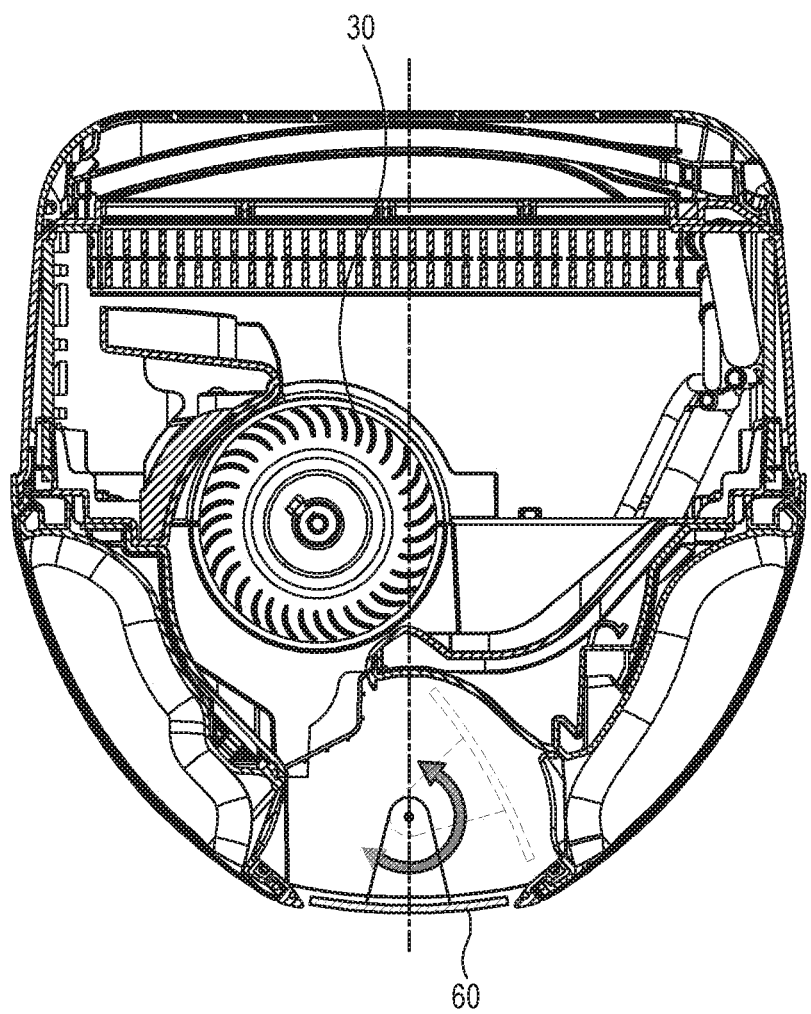
FIGS. 8, 9, and 10 illustrate an example that the blade of the air conditioner is used to control a wind direction of a direct wind according to various embodiments of the disclosure.
Figure 9:
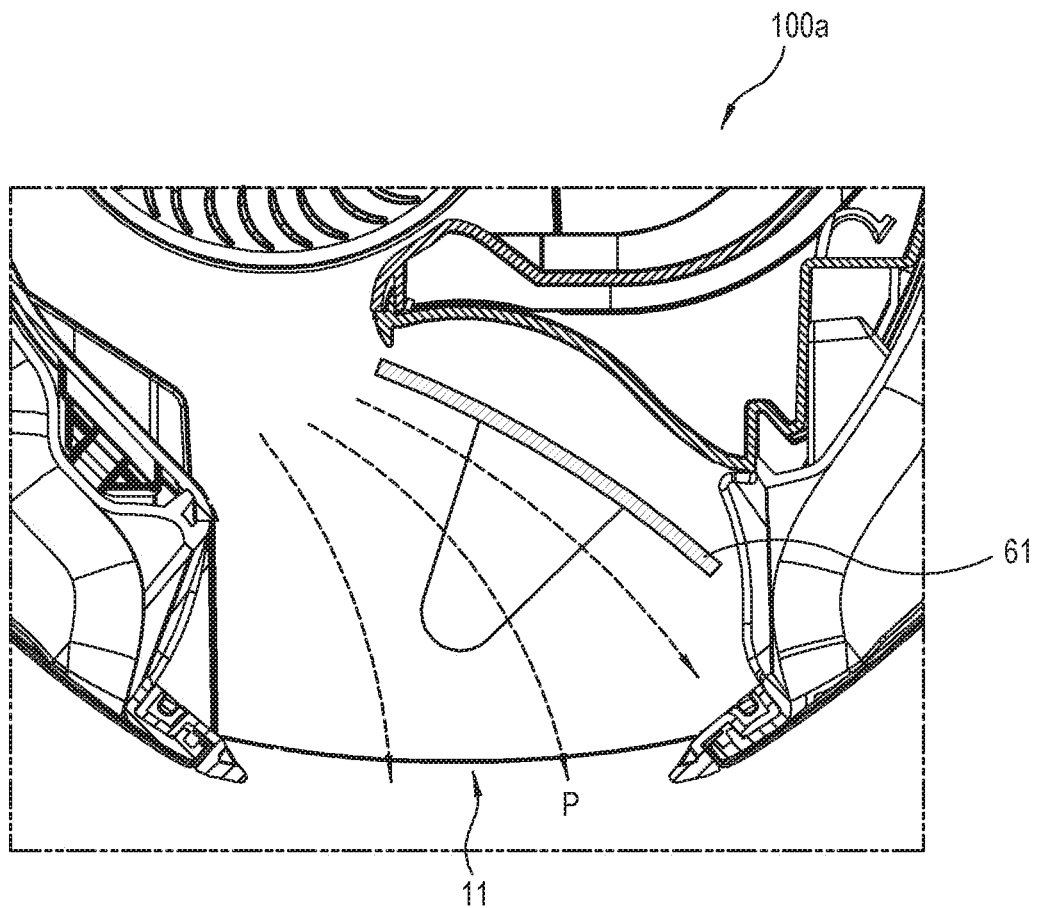
Figure 10:
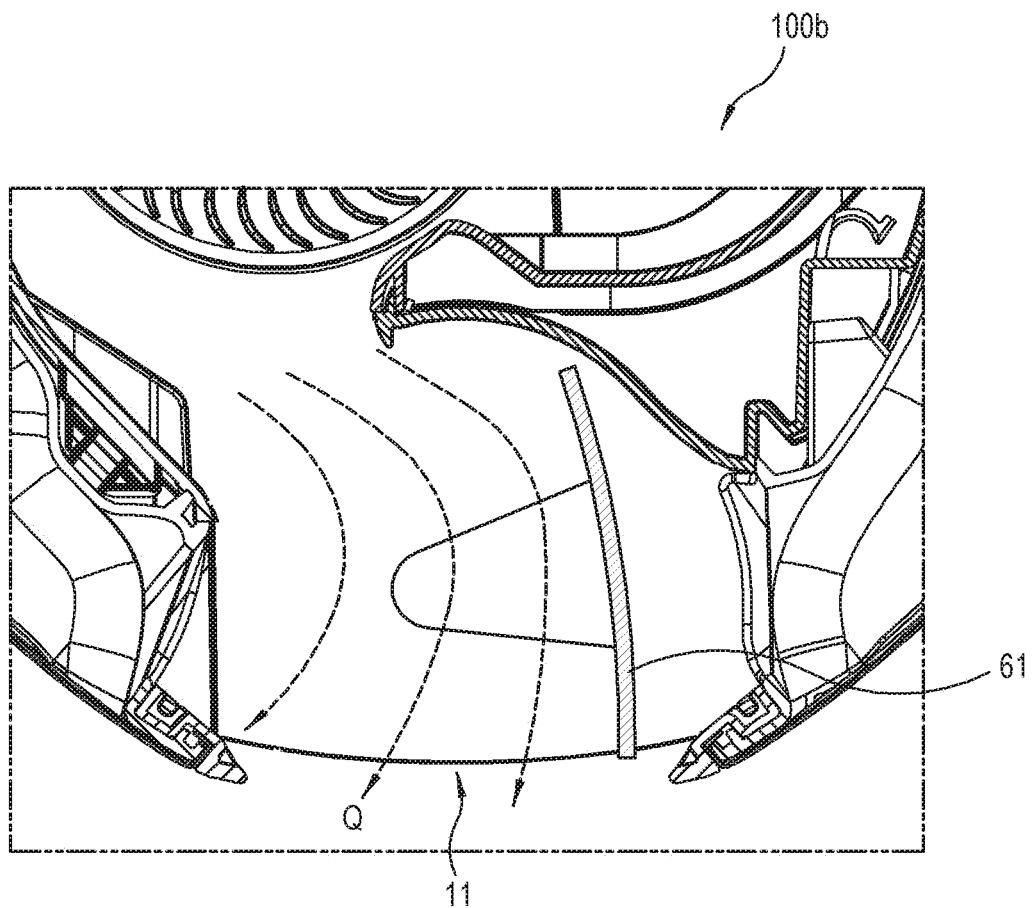

FIGS. 8 to 10 illustrate an example that the blade 60 of the air conditioner 1 is used to control a wind direction of direct wind airflow according to various embodiments of the disclosure.

Referring to FIG. 8, the fan 30 of the air conditioner 1 according to an embodiment of the disclosure may be provided deviating from the center of the air conditioner 1. In this case, the blade 60 is swiveled to an area opposite to the deviation, and only the swiveled angle is varied without changing the swiveling direction, thereby controlling the wind direction of the direct wind airflow.

For example, the blade 60 is swiveled between the open position 100 and the closed position 200, and includes the plate-shaped outer member 61 of which swiveled angles 100*a* and 100*b* at the open position 100 cause the air passed through the basic channel A to be discharged in a first direction P or a second direction Q different from the first direction P. Thus, the plate-shaped outer member 61 is used to control the wind direction of the direct wind airflow.

A detailed method of controlling the direct wind direction using the blade 60 is as follows. The blade 60 makes the air be discharged through the direct-wind outlet 11 at the open position 100, and makes the air be discharged in the first direction P by avoiding the outer member 61 from the channel within the direct-wind outlet 11 of the basic channel A in accordance with the swiveled angles at the open position 100 (see '100*a*' in FIG. 9, referred to as 'first open position'). Further, the blade 60 makes the air flowing in the first direction be curved with the outer member 61 intervening in the channel within the direct-wind outlet 11 of the basic channel A and then discharged in the second direction Q (see '100*b*' in FIG. 10, referred to as 'second open position').

Thus, with a simple structure, it is possible to not only switch over between the low wind-speed airflow and the direct wind airflow, but also control the left and right directions of the direct wind airflow.

Figure 11:
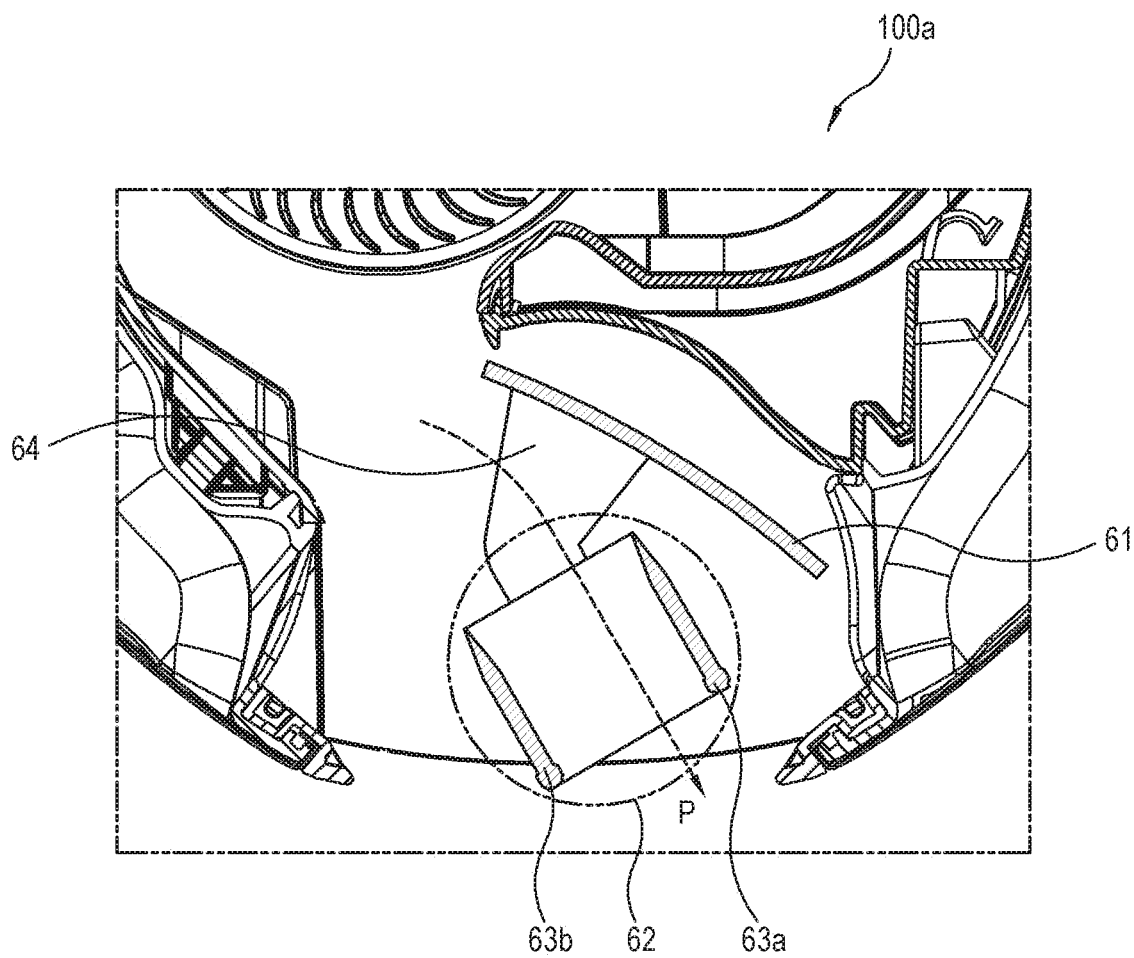
FIGS. 11 and 12 illustrate another example that the blade of the air conditioner is used to control a wind direction of a direct wind according to various embodiments of the disclosure.
Figure 12:
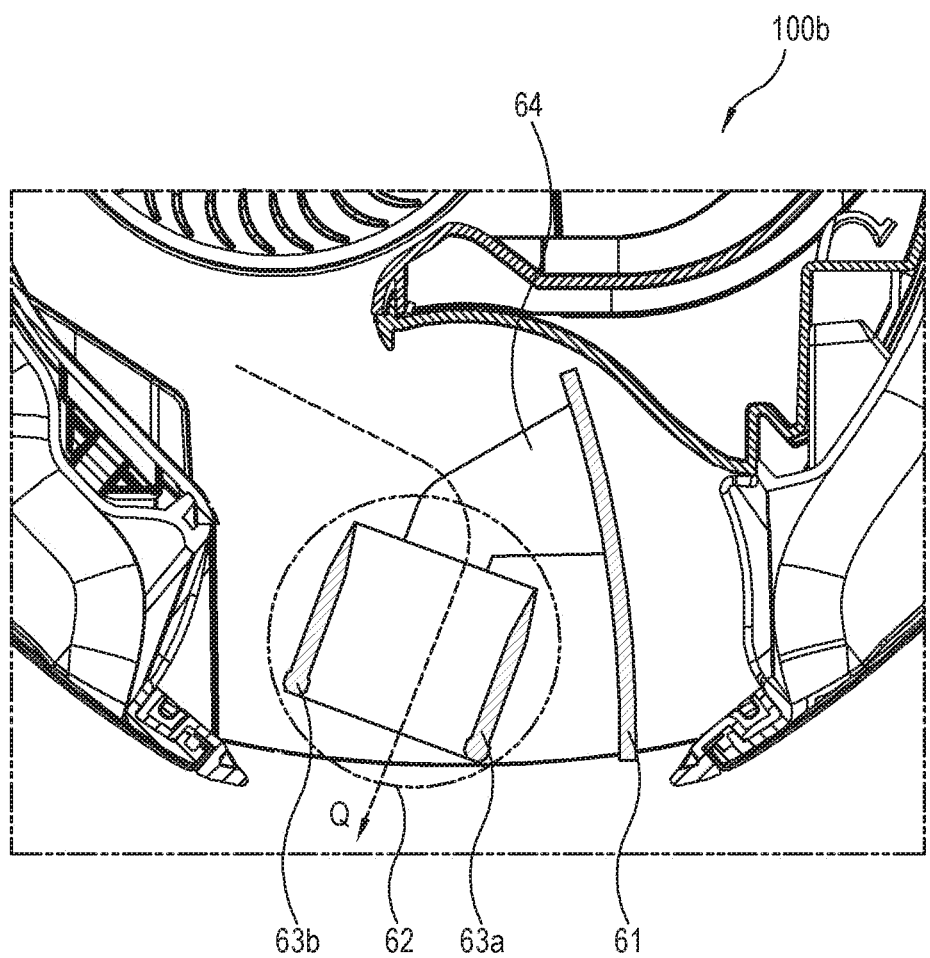

FIGS. 11 and 12 illustrate another example that the blade 60 of the air conditioner 1 is used to control a wind direction of a direct wind according to various embodiments of the disclosure.

Referring to FIGS. 11 and 12, the blade 60 of the air conditioner 1 may include an inner member 62 as well as the outer member 61 in order to more precisely guide the direction of air discharged when a direct wind direction is controlled. The inner member 62 may include a pair of guides 63*a* and 63*b* spaced part from each other. Therefore, the air passed through the basic channel A is discharged in the first direction P or the second direction Q while passing through a channel formed by the pair of guides 63*a* and 63*b* in accordance with the swiveled angles 100*a* and 100*b* at the open position.

Thus, it is possible to more accurately control the direction of the airflow through the blade 60.

The outer member 61 and the inner member 62 of the blade 60 may be provided as a single body, or may be separable. When the outer member 61 and the inner member 62 are provided as the single body, the outer member 61 and the inner member 62 are swiveled together when the blade 60 is swiveled. On the other hand, when the outer member 61 and the inner member 62 are separable, the inner member 62 may be swiveled dependently of the swiveling of the outer member 61, or may be swiveled together and simultaneously with the outer member 61 and more swiveled in itself separately from the outer member 61.

First, features of when the outer member 61 and the inner member 62 of the blade 60 are provided as the single body will be described with reference to FIG. 11 and FIG. 12.

In case of the first open position 100*a*, i.e. when air is discharged in the first direction P by avoiding the outer member 61 from the channel within the direct-wind outlet 11 of the basic channel A, the blade 60 with the inner member 62 makes the air passed through the basic channel A be discharged to the outside along a channel formed by the pair of guides 63*a* and 63*b* as shown in FIG. 11. The air of FIG. 11 discharged through the direct-wind outlet 11 is more converged in the first direction P than that of FIG. 9 showing that the inner member 62 is not present.

On the other hand, in case of the second open position 100*b*, i.e. when air flowing in the first direction is curved with the outer member 61 intervening in the channel within the direct-wind outlet 11 of the basic channel A and then discharged in the second direction Q, the blade 60 with the inner member 62 makes the air passed through the basic channel A be discharged to the outside along the channel formed by the pair of guides 63*a* and 63*b* as shown in FIG. 12. The air of FIG. 12 discharged through the direct-wind outlet 11 is more converged in the second direction P than that of FIG. 10 showing that the inner member 62 is not present.

As described above, when the outer member 61 and the inner member 62 of the blade 60 are provided as a single body, it is possible to achieve structure simplification and cost reduction since the outer member 61 and the inner member 62 are integrally designed and manufactured, as well as have an effect on more accurately controlling the wind direction of the airflow through the inner member 62.

Next, features of when the outer member 61 and the inner member 62 of the blade 60 are separable will be described.

When the outer member 61 and the inner member 62 of the blade 60 are separable, the inner member 62 can swivel independently of the swiveling of the outer member 61. In this regard, descriptions will be made with reference to FIGS. 13 to 15.

Figure 13:
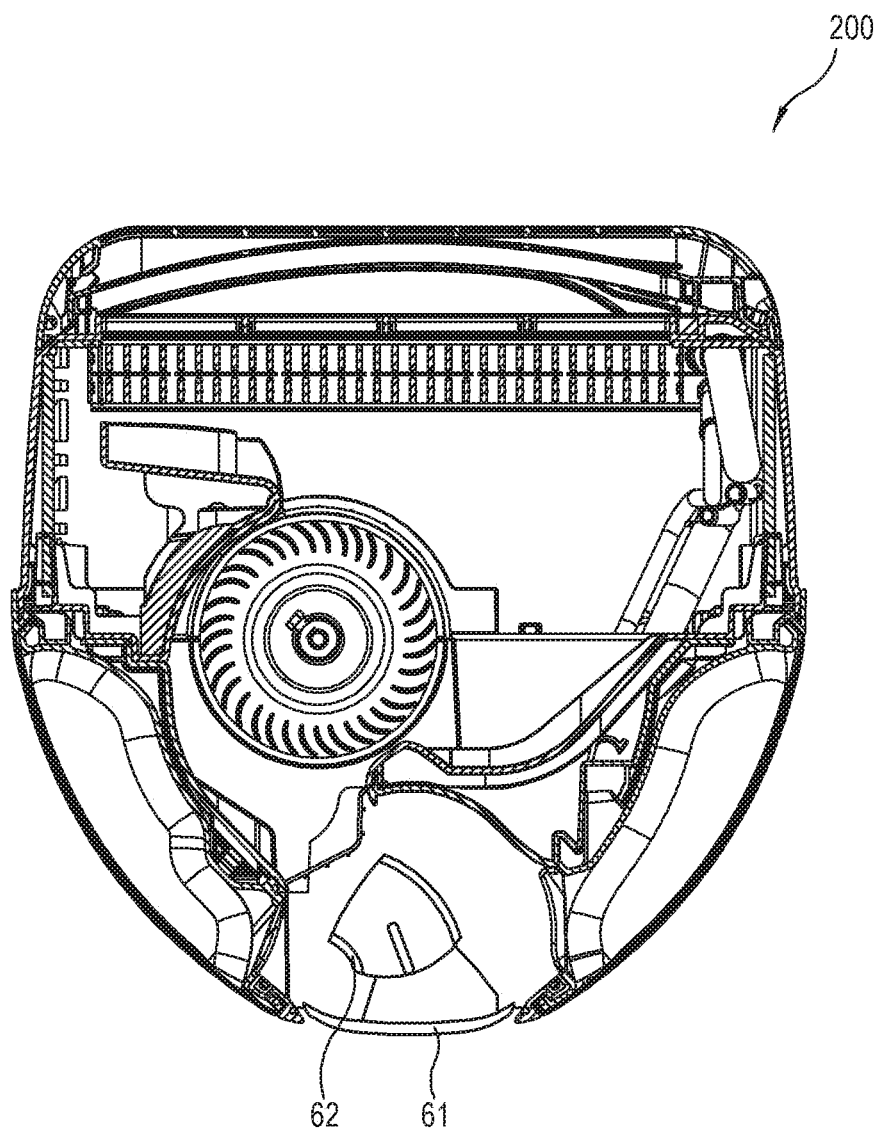
FIGS. 13, 14, and 15 illustrate an example where an outer member and an inner member are separately provided in the blade of the air conditioner (1) according to various embodiments of the disclosure.
Figure 14:
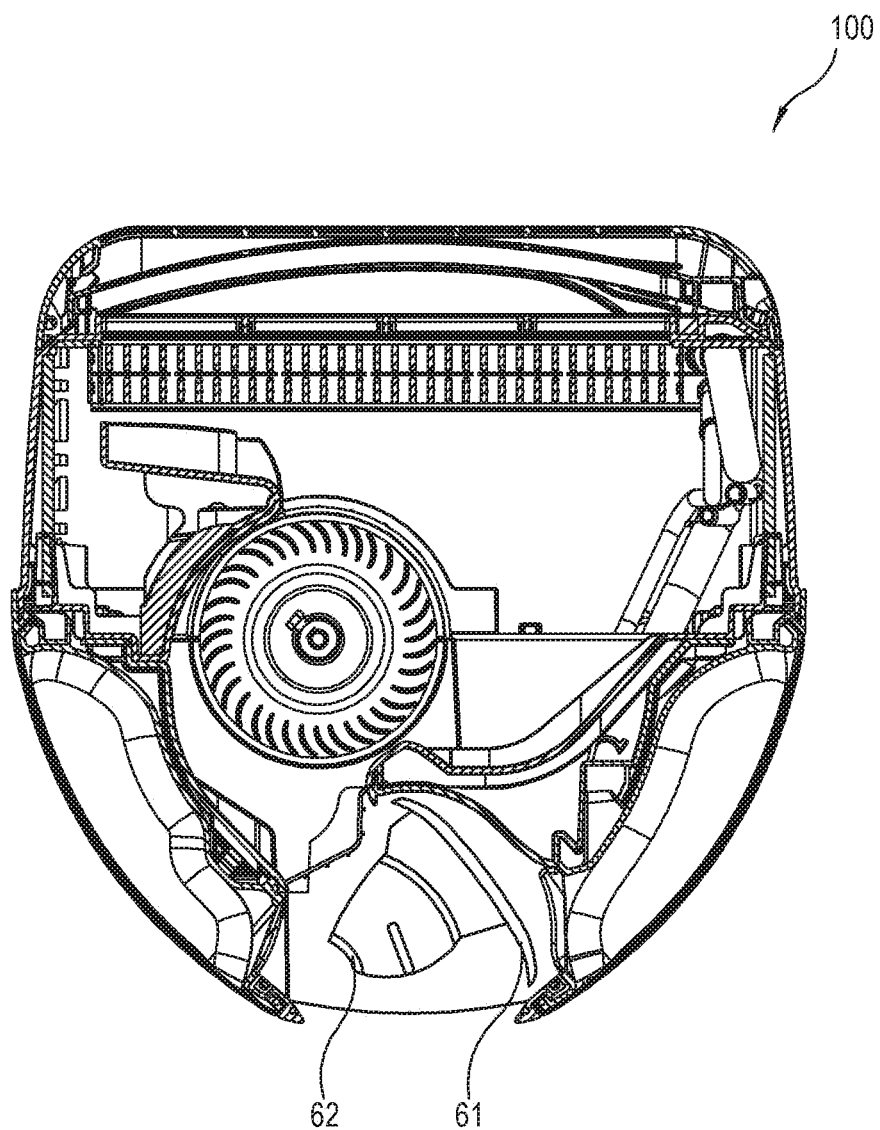
Figure 15:
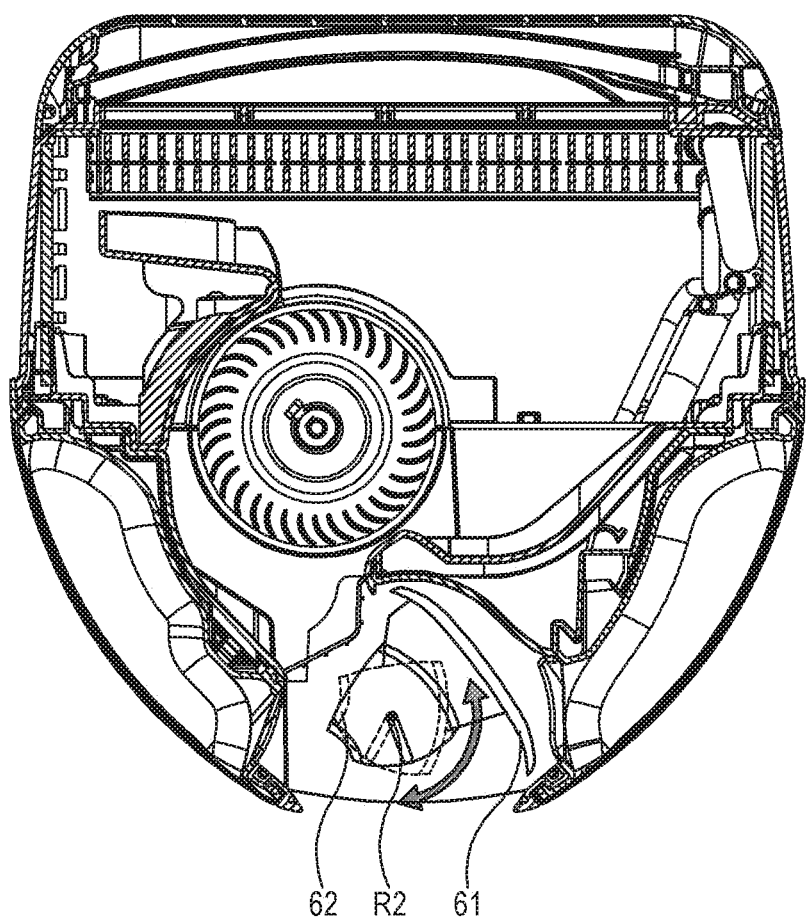

FIGS. 13, 14, and 15 illustrate an example where an outer member 61 and an inner member 62 are separately provided in the blade 60 of the air conditioner 1 according to various embodiments of the disclosure.

Referring to FIGS. 13, 14 and 15, in the air conditioner 1 in which the outer member 61 and the inner member 62 of the blade 60 are separable according to various embodiments of the disclosure, the inner member 62 is free from the swiveling of the outer member 61 even though the outer member 61 is swiveled between the closed position 200 and the open position 100. Further, the inner member 62 may swivel with respect to a rotary shaft R2 independently of the outer member 61 as shown in FIG. 15. The rotary shaft R2 of the inner member 62 may be given concentrically or eccentrically with the rotary shaft of the outer member 61.

Thus, it is possible to more precisely control the wind direction of the direct wind airflow.

Alternatively, the inner member 62 of the blade 60 separable from the outer member 61 may be swiveled together and simultaneously with the outer member 61 and more swiveled in itself separately from the outer member 61. In this regard, descriptions will be made with reference to FIGS. 16 to 18.

Figure 16:
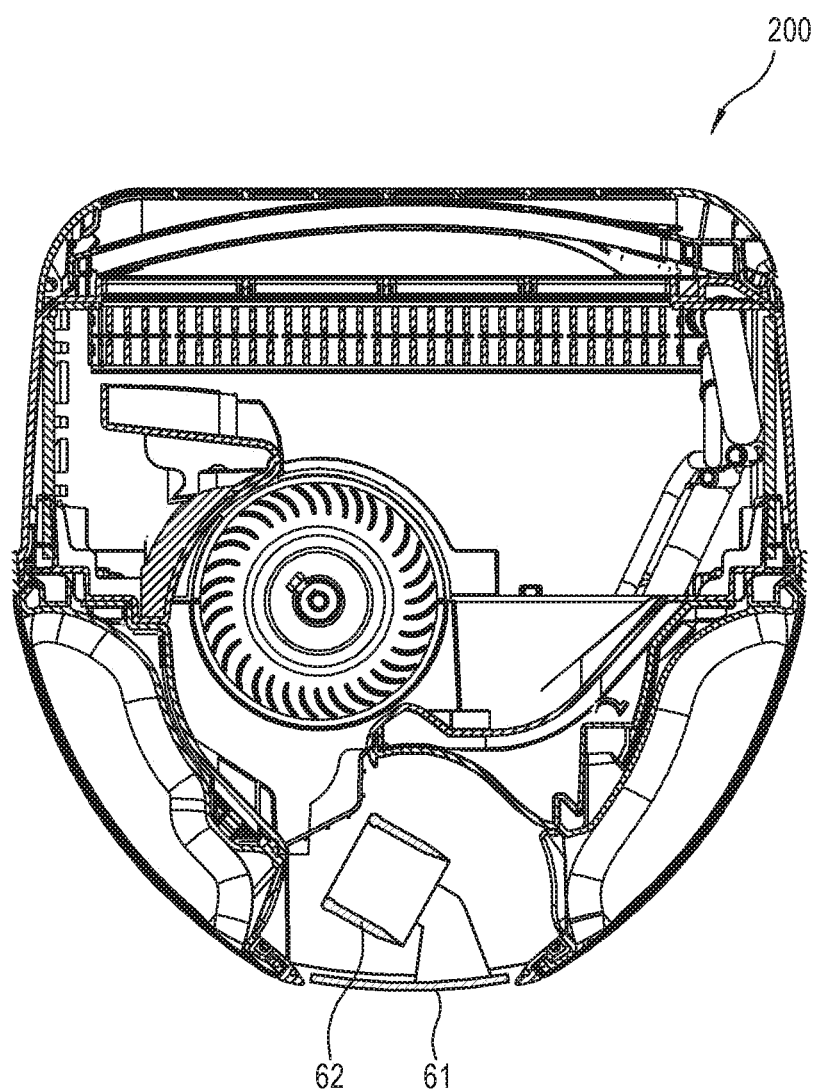
FIGS. 16, 17, and 18 illustrate another example where an outer member and an inner member are separately provided in the blade of the air conditioner according to various embodiments of the disclosure.
Figure 17:
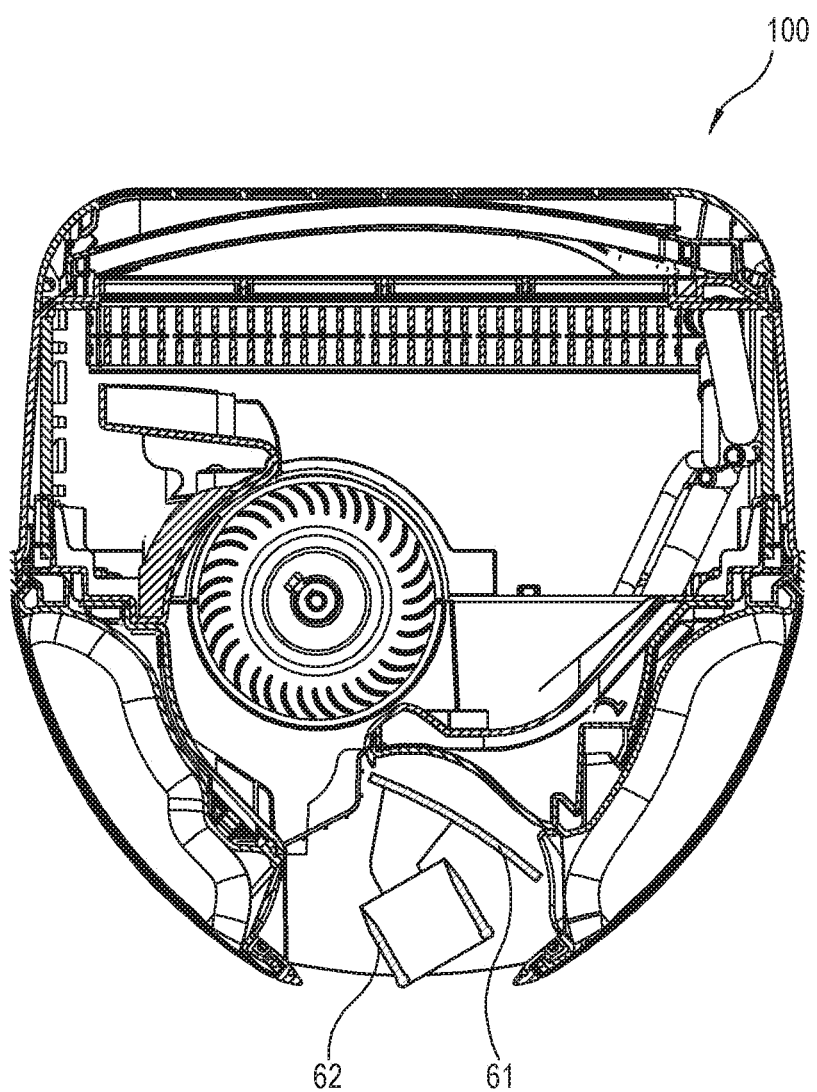
Figure 18:
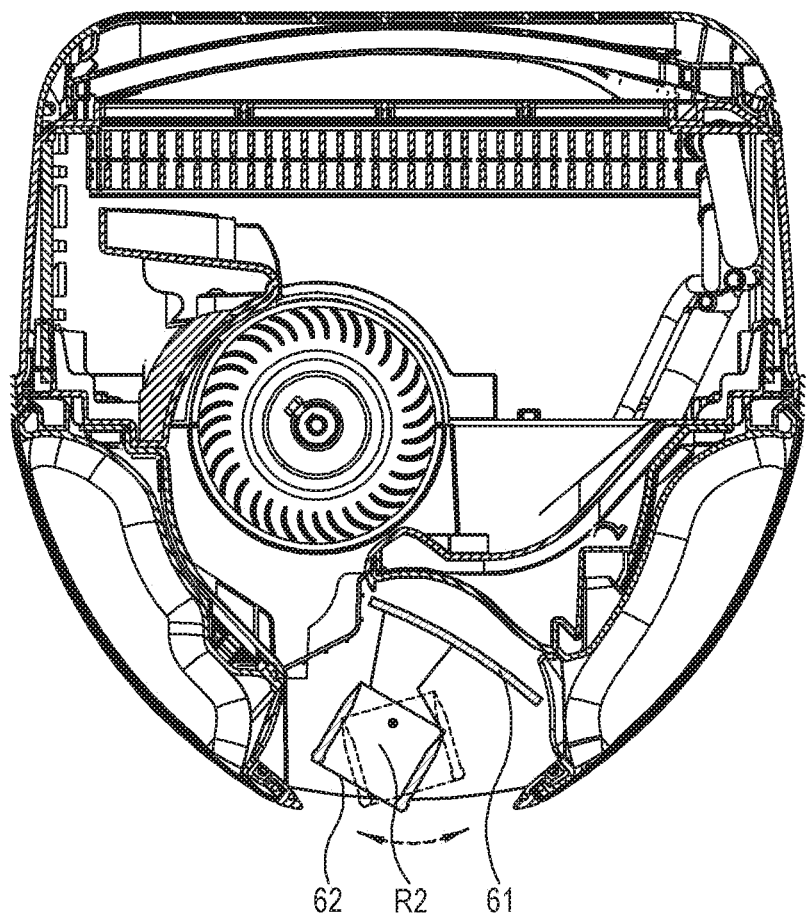

FIGS. 16, 17, and 18 illustrate another example where an outer member 61 and an inner member 62 are separately provided in the blade 60 of the air conditioner 1 according to various embodiments of the disclosure.

In the air conditioner 1 in which the outer member 61 and the inner member 62 of the blade 60 are separable according to an embodiment of the disclosure, the inner member 62 may be swiveled together with the outer member 61 as the outer member 61 is swiveled between the closed position 200 and the open position 100 as shown in FIG. 16 and FIG. 17. Further, the inner member 62 may be swiveled with respect to the rotary shaft R2 separately from and independently of the outer member 61 as shown in FIG. 18. The rotary shaft R2 of the inner member 62 may be the same as or different from the rotary shaft of the outer member 61.

Thus, it is possible to more precisely control the wind direction of the direct wind airflow.

Figure 19:
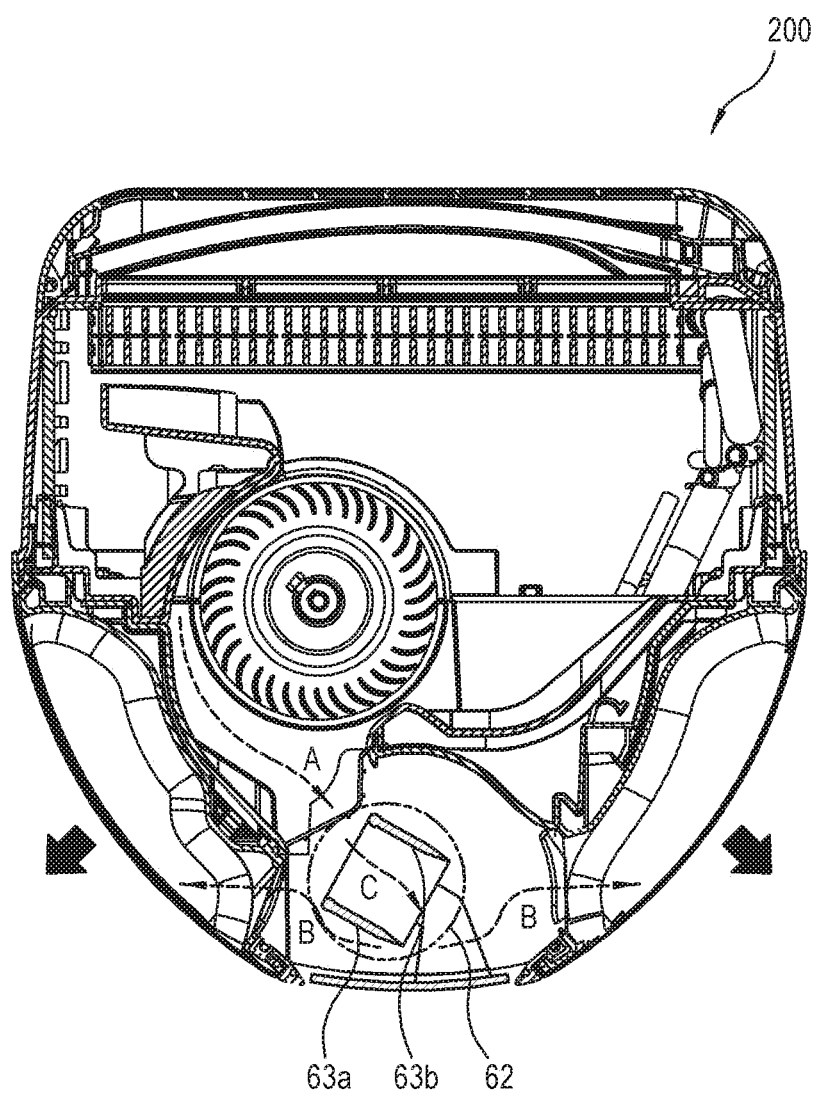
FIG. 19 shows a relationship between a basic channel and a low wind-speed channel when the blade of the air conditioner includes the inner member according to an embodiment of the disclosure.

FIG. 19 shows a relationship between a basic channel A and a low wind-speed channel B when the blade 60 of the air conditioner 1 includes the inner member 62 according to an embodiment of the disclosure.

In the air conditioner 1 according to an embodiment of the disclosure, when the blade 60 with the inner member 62 is at the closed position 200, a channel C formed by the pair of guides 63a and 63b of the inner member 62 may be formed between the basic channel A and the low wind-speed channel B. Unlike the channel formed from the back of the inner member 62 frontward in case of FIG. 11 and FIG. 12 where the blade 60 is at the open position 100, the channel is formed from the front of the inner member 62 backward in case of FIG. 19 where the blade 60 is at the closed position 200.

Thus, the basic channel A and the low wind-speed channel B are more smoothly connected by the guide of the inner member 62.

FIGS. 20 to 24 illustrate the blade 60 of the air conditioner 1 according to various embodiments of the disclosure.

Figure 20:
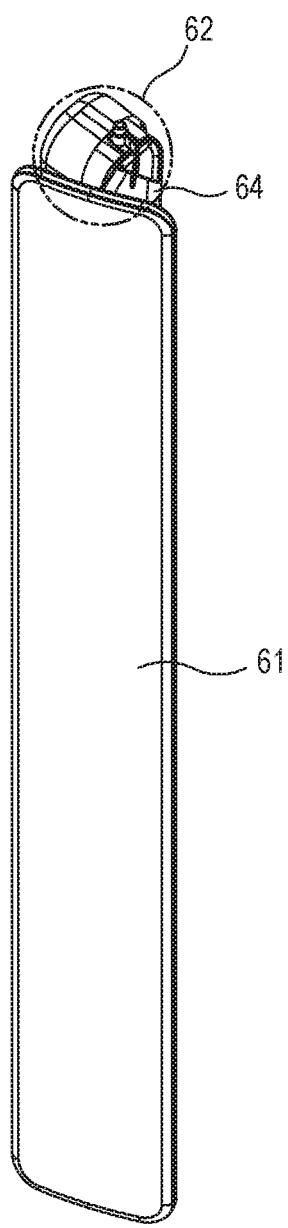
FIGS. 20, 21, 22, 23, and 24 illustrate the blade of the air conditioner according to various embodiments of the disclosure.
Figure 21:
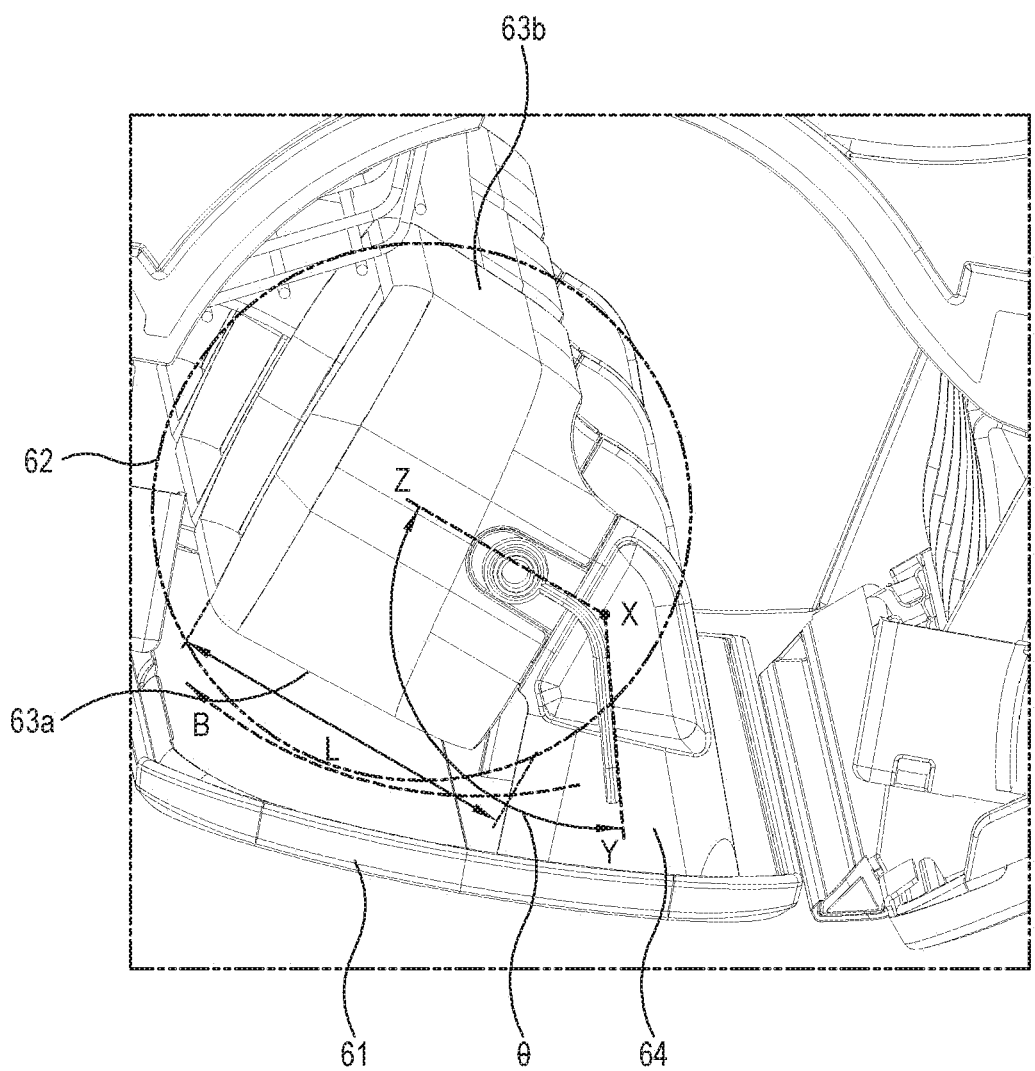
Figure 22:
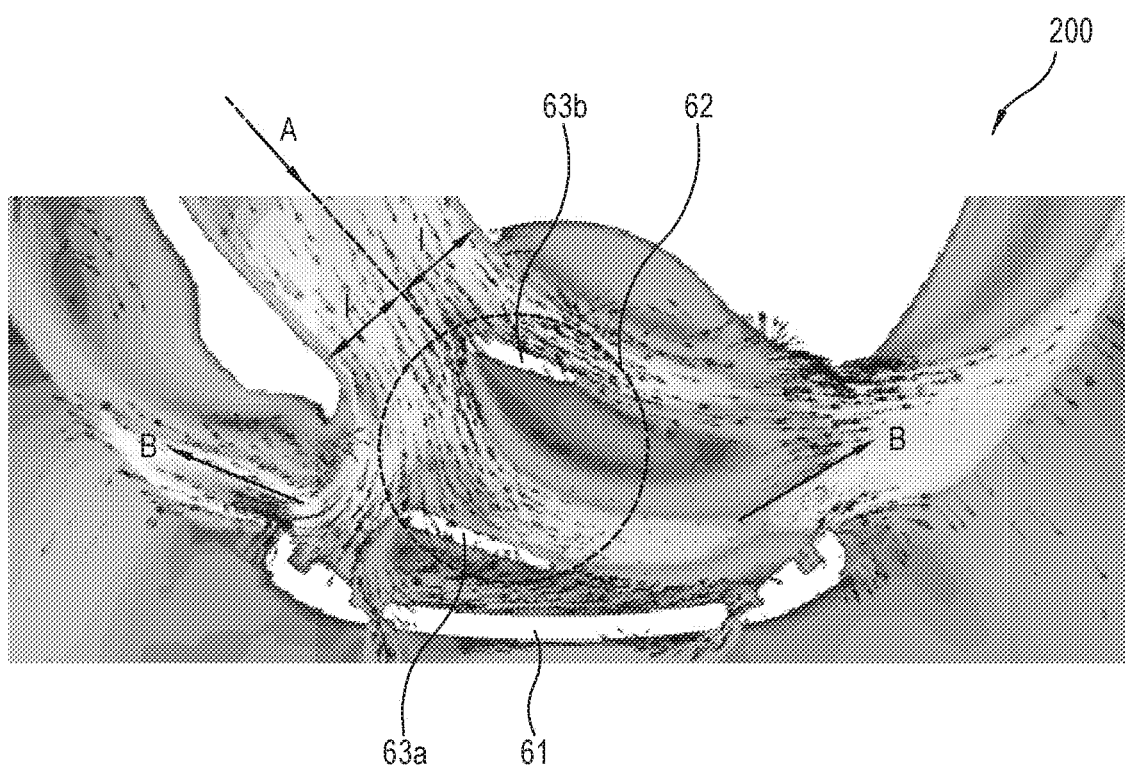
Figure 23:
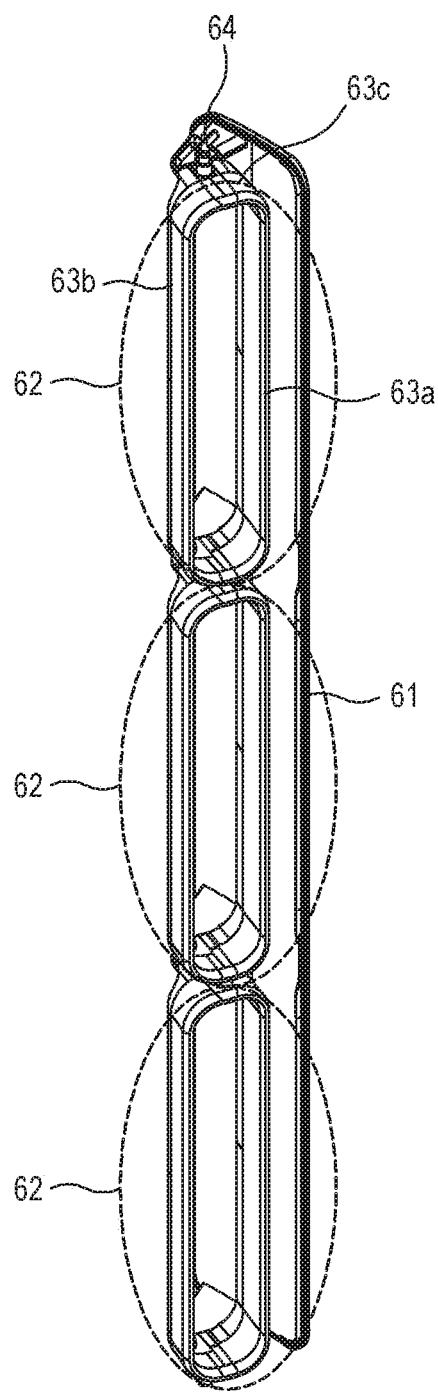
Figure 24:
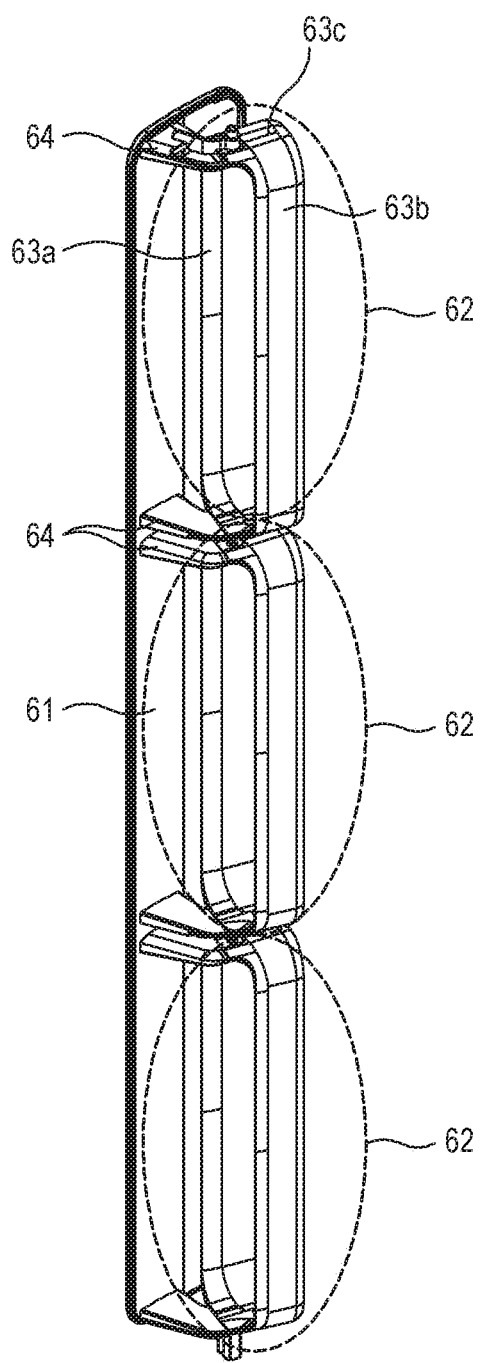

FIG. 20 is a front view of the blade 60, FIG. 21 is a top view of the blade 60, FIG. 22 shows an example that airflow is distributed by the blade 60, FIG. 23 is a left side view of the blade 60, and FIG. 24 is a right side view of the blade 60.

Referring to FIGS. 20-24, the blade 60 of the air conditioner 1 may include the plate-shaped outer member 61, the inner member 62 having the pair of guides 63a and 63b and a connection member 63c being in contact with one side of each guide 63a and 63b and connecting the pair of guides 63a and 63b, and the support member 64. There are no limits to the number of outer members 61 and inner members 62 included in one blade 60. In other words, one blade 60 may include a plurality of outer members 61 or a plurality of inner members 62. For example, as shown in FIGS. 23 and 24, the blade 60 may include a plurality of inner members 62 in which the pair of guides 63a and 63b provided along the lengthwise direction of the outer member 61 are connected at opposite sides by the connection members 63c and each connection member 63c is supported by the support member 64, and the plurality of inner members 62 may be adjacent to each other and arranged in succession.

When the outer member 61 and the inner member 62 of the blade 60 are provided as a single body, for example, when each of the outer member 61 and the inner member 62 are coupled to the support member 64, the outer member 61 and the inner member 62 of the blade 60 may be provided forming a predetermined angle θ. For example, the outer member 61 and the inner member 62 of the blade 60 may be provided as shown in FIG. 21 so that a line X-Y crossing a rotary shaft X of the blade 60 and tangent to the outer member 61 can be formed at a predetermined angle θ to a line X-Z crossing the rotary shaft X of the blade 60 and oriented toward the channel formed by the guides 63a and 63b of the inner member 62. In this case, when the blade 60 is at the closed position 200, a front direction of the inner member 62 (i.e. a direction from X toward Z) may be oriented toward the basic channel A (see FIG. 19) so that the air passed through the basic channel A can be extended to the low wind-speed channel B. When the blade 60 is at the first open position 100a, a rear direction of the inner member 62 (i.e. a direction from Z toward X) may be oriented toward the basic channel A and the front direction of the inner member 62 opposite to the rear direction may be oriented toward the first direction P (see FIG. 11) so that the air passed through the basic channel A can be guided in the first direction P. When the blade 60 is at the second open position 100b, the front direction of the inner member 62 may be oriented toward the second direction Q and the rear direction of the inner member 62 may be oriented toward the opposite direction (see FIG. 12) so that the low wind-speed channel B can be blocked by the outer member 61 and at the same time guided toward the second direction Q by the inner member 62. Thus, it is possible to not only switch over between the low wind-speed airflow and the direct wind airflow but also control the left and right directions of the direct wind airflow even though the outer member 61 and the inner member 62 of the blade 60 are provided as a single body and the outer member 61 and the inner member 62 are integrally swiveled when the blade 60 is swiveled.

In addition, the outer member 61 and the inner member 62 of the blade 60 may be provided forming an angle as shown in FIG. 22 so that one guide (e.g. 63b in FIG. 22) between the pair of guides 63a and 63b of the inner member 62 can be positioned at the center of the basic channel A when the blade 60 is at the closed position 200. Thus, it is possible to minimize flow resistance of a channel and uniformly distribute airflow passed through the basic channel A to both sides of the low wind-speed channel B when the blade 60 is at the closed position 200. Even when the outer member 61 and the inner member 62 of the blade 60 are provided as a separable type, the same effect is given by controlling the swiveling of the inner member 62 so that one guide 63a or 63b between the pair of guides 63a and 63b can be positioned at the center of the basic channel A as the blade 60 is swiveled to the closed position 200

The blade 60 of the air conditioner 1, according to an embodiment of the disclosure, may be provided to not only form a predetermined angle θ between the outer member 61 and the inner member 62, but also make the guide 63a close to the outer member 61 between the pair of guides 63a and 63b of the inner member 62 be shorter than or equal to a predetermined length. In case where the guide 63a close to the outer member 61 between the pair of guides 63a and 63b of the inner member 62 is longer than a predetermined length, e.g. L of FIG. 21, the low wind-speed channel (see 'B' in FIG. 21) between the outer side of the inner member 62 and the inner side of the outer member 61 may be interfered or blocked by the guide 63a when the blade 60 is at the closed position 200 and thus the air passed through the basic channel A and the inner member 62 flows toward the low wind-speed channel B. Therefore, the blade 60 of the air conditioner 1 according to an embodiment of the disclosure may be formed so that the low wind-speed channel B can pass through between the outer side of the inner member 62 and the inner side of the outer member 61 since the outer member 61 and the inner member 62 of the blade 60 form a predetermined angle θ and the guide 63a closer to the outer member 61 between the pair of guides 63a and 63b of the inner member 62 is equal to or shorter than a predetermined length.

Thus, even though the blade 60 is provided with the inner member 62, the inner member 62 does not interfere with the low wind-speed channel B in the case where the blade 60 is at the closed position 200, thereby making the blown air smoothly move to the low wind-speed channel B.

On the other hand, the blade 60 of the air conditioner 1 according to another embodiment of the disclosure may include the inner member 62 having the pair of guides 63a and 63b, of which the guide 63a close to the outer member 61 is longer than a predetermined length. Thus, when the blade 60 is at the closed position 200, the guide 63a close to the outer member 61 between the pair of guides 63a and 63b of the inner member 62 interfere with or block the low wind-speed channel passing through between the outer side of the inner member 62 and the inner side of the outer member 61, thereby uniformly distributing the airflow passed through the basic channel A to both sides of the low wind-speed channel B.

In the foregoing embodiments, the wind direction of the direct wind is controlled while the blade 60 is swiveled in one direction (for example, in the counterclockwise direction), but the disclosure is not limited thereto. For example, the blade 60 may be swiveled in the clockwise direction and the counterclockwise direction with respect to the center of the air conditioner 1, and the wind direction may be controlled in accordance with swiveling directions. Specifically, when the blade 60 is swiveled in the clockwise direction, the direct wind airflow is controlled to be oriented in a rightward direction. When the blade 60 is swiveled in the counterclockwise direction, the direct wind airflow is controlled to be oriented in a leftward direction. When the blade 60 controls the wind direction while swiveling in the clockwise direction and the counterclockwise direction with respect to the center of the air conditioner 1, it is possible to control the wind direction by movement of the blade 60 even through the fan 30 is not deviated from but aligned with the center of the air conditioner 1.

Further, in the foregoing embodiment, the blade 60 is swiveled to switch over between the direct wind airflow and the low wind-speed airflow, but the disclosure is not limited thereto. For example, the blade 60 of the air conditioner 1 according to another embodiment of the disclosure may move forward or backward with respect to the front panel 10a to thereby switch over between the direct wind airflow and the low wind-speed airflow. In this regard, descriptions will be made with reference to FIGS. 25 to 27.

Figure 25:
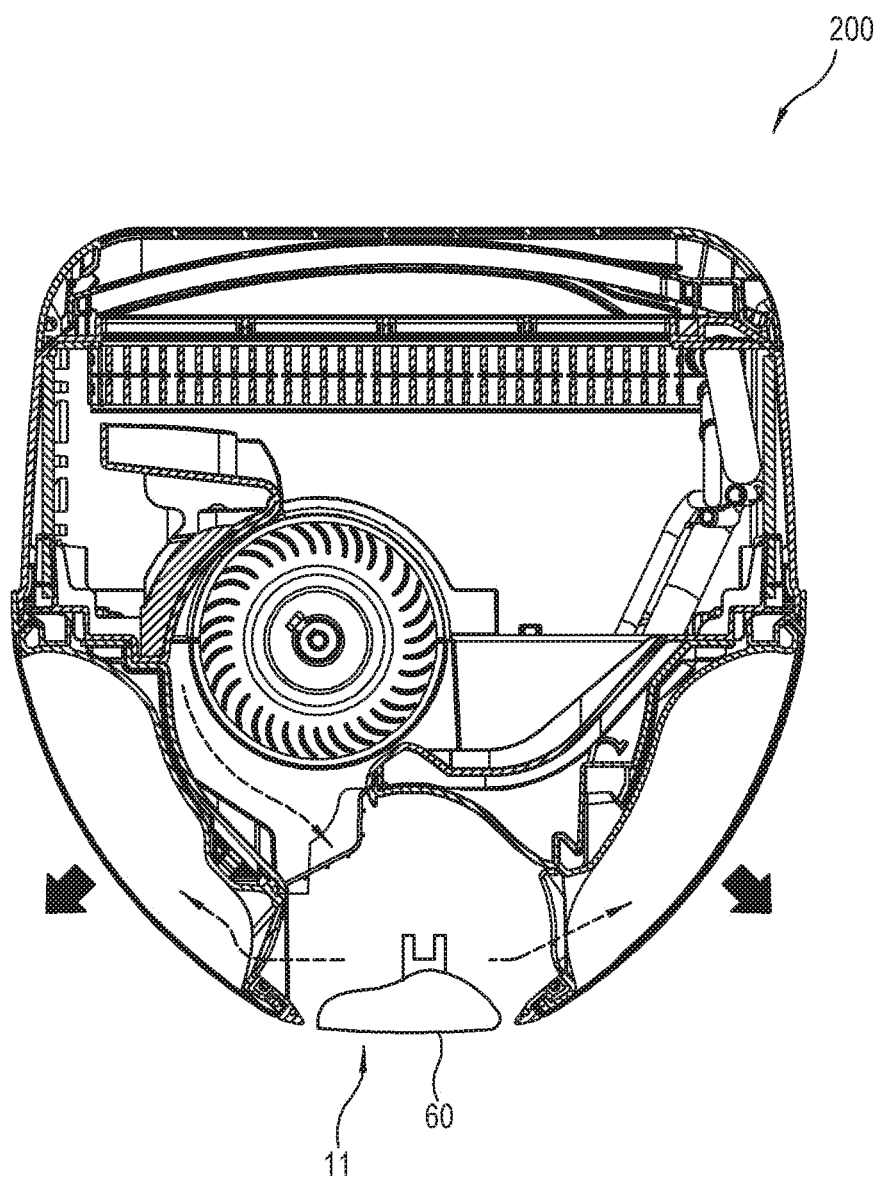
FIGS. 25, 26, and 27 illustrate another example of switching over between direct wind airflow and low wind-speed airflow in the air conditioner according to various embodiments of the disclosure.
Figure 26:
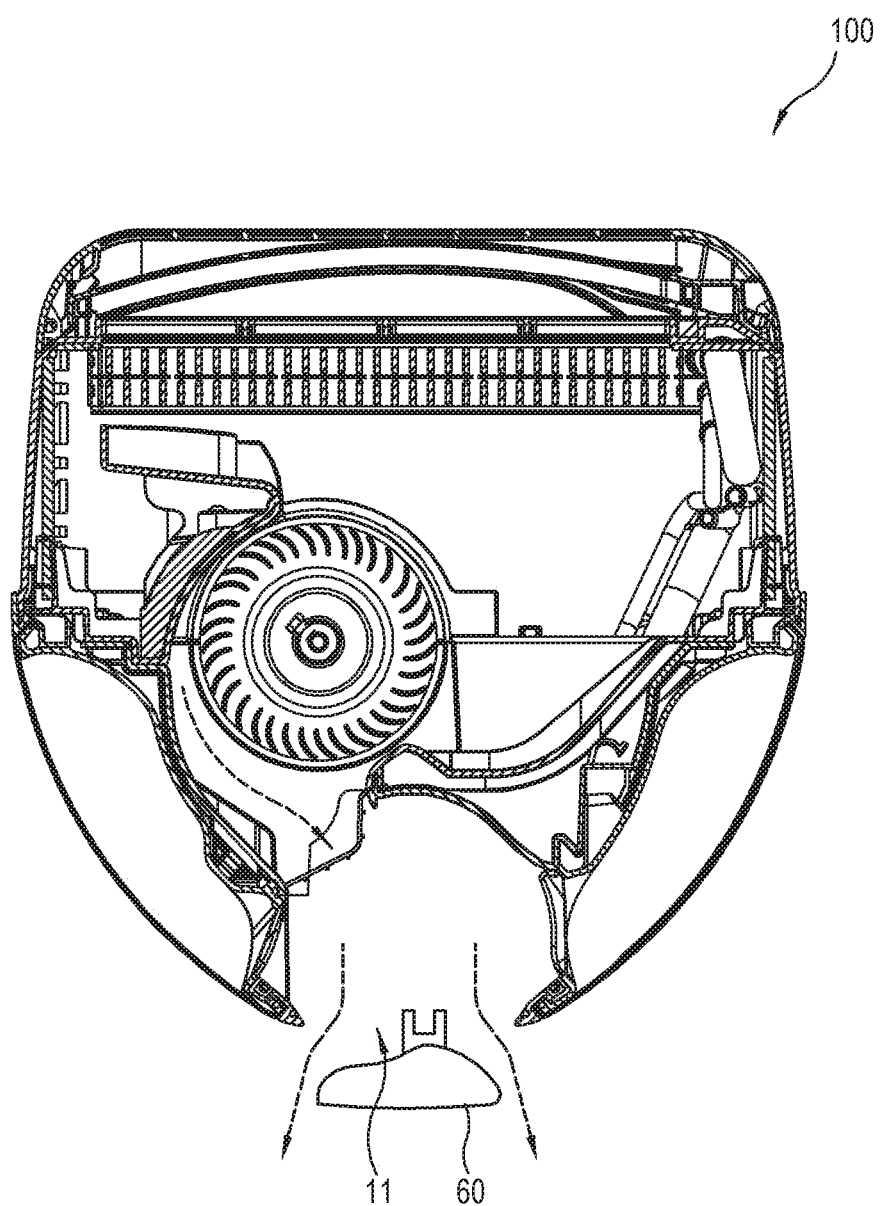
Figure 27:
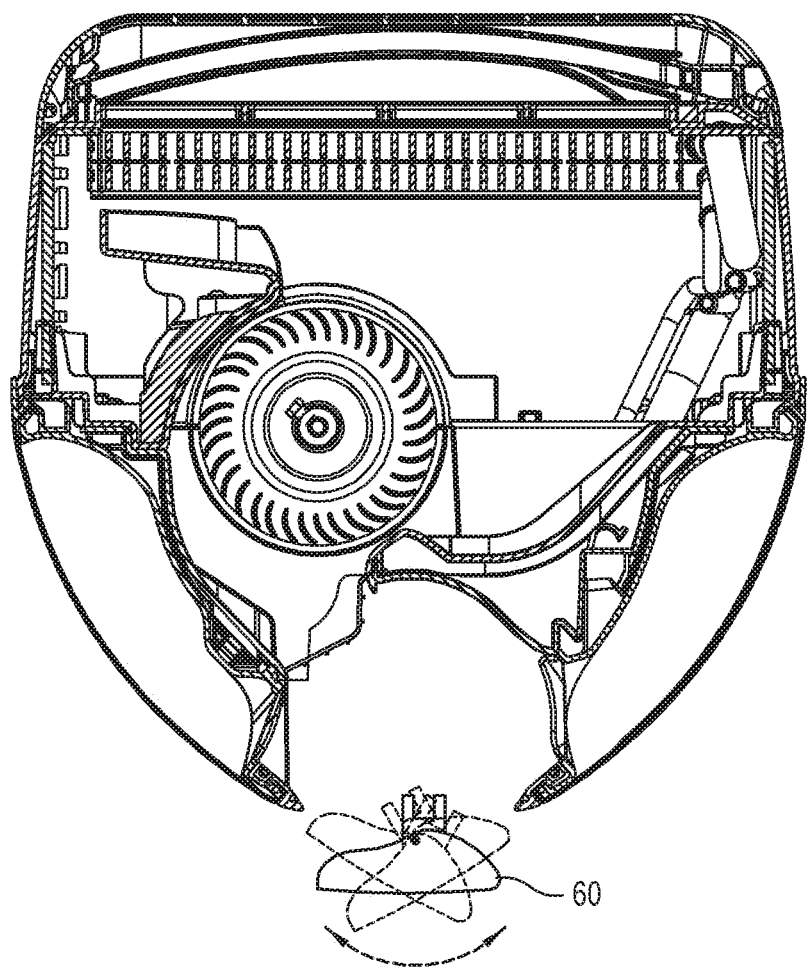

FIGS. 25, 26, and 27 illustrate another example of switching over between direct wind airflow and low wind-speed airflow in the air conditioner 1 according to various embodiments of the disclosure.

Referring to FIG. 25, the blade 60 of the air conditioner 1 according to an embodiment of the disclosure is at the closed position 200. This position of the blade 60 is equivalent to the closed position 200 of the blade 60 in the foregoing embodiments where the direct-wind outlet 11 is opened and closed by the swiveling of the blade 60.

However, the open position 100 of the blade 60 is different from that of the foregoing embodiment. Referring to FIG. 26 showing that the blade 60 of the air conditioner 1 according to another embodiment of the disclosure is at the open position 100, the blade 60 according to this embodiment moves frontward with respect to the front panel 10a so as to move to the open position 100 and open the direct-wind outlet 11 unlike the foregoing embodiments where the direct-wind outlet 11 is opened by the swiveling of the blade 60, thereby discharging the direct wind airflow through the opened direct-wind outlet 11. Then, when the blade 60 moves backward with respect to the front panel 10a and returns to the closed position 200, the direct-wind outlet 11 is closed and the airflow is switched over to the low wind-speed airflow.

Further, the blade 60 of the air conditioner 1 according to this embodiment controls the wind direction of the direct wind. For example, when the blade 60 is at the open position 100 as shown in FIG. 26, it is possible to control the wind direction of the direct wind by swiveling the blade 60. Specifically, as shown in FIG. 27, the blade 60 swivels in the clockwise direction or the counterclockwise direction, so that the direct wind airflow discharged through the direct-wind outlet 11 can be discharged in a one-sided direction with respect to the center of the air conditioner 1.

Below, operations of the air conditioner 1 according to an embodiment of the disclosure will be described.

When a user turns on the air conditioner 1 by pressing a power button provided in a remote controller or the air conditioner 1 or the like method, the air conditioner 1 starts operating according to an embodiment of the disclosure.

When starting the operation, the air conditioner 1 may operate in a direct wind mode or a low wind-speed mode. The direct wind mode refers to that the blade 60 is moved or swiveled to the open position 100 and thus the air passed through the basic channel is discharged to the outside of the air conditioner 1 through the direct-wind outlet 11. The low wind-speed mode refers to that the blade 60 is moved or swiveled to the closed position 200 and thus the air passed through the basic channel moves to the low wind-speed channel and is discharged to the outside of the air conditioner 1 through the pores 51 of the porous panel 50. In the low wind-speed mode, the rotating speed of the fan 30 may be lower than that in the direct wind mode. When starting the operation of the air conditioner 1, the mode in which the air conditioner 1 operates may be determined by a preset initial value, may be set by a user, or may be automatically determined by the air conditioner 1 based on the lasted operation mode information, other circumstance information, etc.

For example, when the air conditioner 1 is determined to start operating in the direct wind mode, the controller controls the blade 60, which has been at the closed position 200 while the air conditioner 1 is turned off, to be moved or swiveled to the open position 100, and properly controls the other elements of the air conditioner 1 so that the air can be discharged to the outside through the direct-wind outlet 11.

In the direct wind mode, the wind direction in which the direct wind blows is also controllable. Based on a user command or determination in the air conditioner 1, the controller of the air conditioner 1 controls the blade 60 to be swiveled to the first open position 100a or the second open position 100b so that the air discharged from the air conditioner 1 can be directed toward the first direction P or the second direction Q. However, there are no limits to the position and the swiveled angle, to which the blade 60 is swiveled, and the corresponding discharging direction of the air.

Further, when the blade 60 includes the outer member 61 and the inner member 62 and two members are provided as a separable type, the controller of the air conditioner 1 swivels the inner member 62 in response to a user command or the determination in the air conditioner 1, thereby more precisely controlling the wind direction of the direct wind.

When a command or a control signal for switching over from the direct wind mode to the low wind-speed mode is received, the controller of the air conditioner 1 may control the blade 60 to be moved or swiveled to the closed position 200. Therefore, the air blown inside the air conditioner 1 is discharged to the outside of the air conditioner 1 via the pores 51 of the porous panel 50. On the other hand, when a command or a control signal for switching over from the low wind-speed mode to the direct wind mode is received, the controller of the air conditioner 1 may control the blade 60 to be moved or swiveled to the open position 100. Therefore, the air blown inside the air conditioner 1 is discharged to the outside of the air conditioner 1 via the direct-wind outlet 11.

When a command for turning off the air conditioner 1 is input during the low wind-speed mode, the controller does not separately control the blade 60 and stops operating the other elements since the blade 60 has already been at the closed position 200, thereby stopping the operation of the air conditioner 1. On the other hand, when a command for turning off the air conditioner 1 is input during the direct wind mode, the controller controls the blade 60 to move or swivel from the open position 100 to the closed position 200 and stops operating the other elements, thereby stopping the operation of the air conditioner 1. Thus, the blade 60 being at the closed position 200 partially forms the outer appearance of the air conditioner 1 while the air conditioner 1 is not operating.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An air conditioner comprising:
    a housing configured to form an appearance of the air conditioner and comprising at least one direct-wind outlet to discharge air from an inside to an outside of the air conditioner;
    a heat exchanger positioned inside the housing;
    a fan configured to generate air flow, such that air flows through the heat exchanger and into the air conditioner;
    at least one duct including:
        a first channel forming surface configured to form a basic channel for guiding the air, and
        a second channel forming surface configured to form a low wind-speed channel extended from the basic channel;
    a porous panel corresponding to the second channel forming surface, the porous panel including a plurality of pores;
    a blade configured to:
        swivel between a closed position in which the blade blocks the at the at least one direct-wind outlet of the housing and an open position in which the blade enters into the housing from the at least one direct-wind outlet to open the at least one direct-wind outlet,
        block the low wind-speed channel at the open position so that the air passed through the basic channel is discharged outside of the air conditioner,
        direct the air passed through the basic channel to the low wind-speed channel at the closed position, and
        discharge the air to the outside via the plurality of pores at the closed position;
    a driver configured to drive the blade to swivel; and
    at least one processor configured to control the driver.

2. The air conditioner according to claim 1, wherein the porous panel comprises a first porous panel and a second porous panel spaced apart at a predetermined distance from each other to form a direct-wind outlet so that the air passed through the basic channel is discharged to the outside at the open position of the blade.

3. The air conditioner according to claim 1,
    wherein the fan is deviated from a center of the air conditioner, and
    wherein the blade is swiveled to an area opposite to the deviation.

4. The air conditioner according to claim 1,
    wherein the blade comprises a plate-shaped outer member, and
    wherein, based on the blade being in the open position, the blade is configured to swivel in a first direction or a second direction different from the first direction to direct the air passed through the basic channel in accordance with swiveled angles of the blade.

5. The air conditioner according to claim 4,
    wherein the blade is configured to:
        direct the air to be discharged through the direct-wind outlet at the open position,
        direct the air, in accordance with swiveled angles at the open position, to be discharged in the first direction by avoiding the plate-shaped outer member from a channel between the basic channel and the direct-wind outlet, and
        direct the air flowing in the first direction to be curved and discharged in the second direction by intervening the plate-shaped outer member in the channel between the basic channel and the direct-wind outlet.

6. The air conditioner according to claim 4,
    wherein the blade comprises an inner member with a pair of guides spaced apart from each other, and
    wherein the air passed through the basic channel is discharged in the first direction or the second direction while passing through a channel formed by the pair of guides, in accordance with swiveled angles at the open position.

7. The air conditioner according to claim 6, wherein the plate-shaped outer member and the inner member of the blade are formed as a single body.

8. The air conditioner according to claim 6,
    wherein the plate-shaped outer member and the inner member of the blade are connected by a support member, and
    wherein the inner member is arranged to be swiveled with respect to one end of the support member.

9. The air conditioner according to claim 6, wherein the channel formed by the pair of guides of the inner member at the closed position is formed between the basic channel and the low wind-speed channel.

10. The air conditioner according to claim 6, wherein the plate-shaped outer member and the inner member of the blade at the open position are configured to form a predetermined angle so that the plate-shaped outer member blocks the low wind-speed channel and the inner member serves as a guide in the second direction.

11. The air conditioner according to claim 6, wherein the plate-shaped outer member and the inner member of the blade at the closed position are configured to form a predetermined angle so that one guide among the pair of guides of the inner member is positioned at a center of the basic channel.

12. The air conditioner according to claim 10, wherein the blade is provided comprising the inner member of which the guide close to the plate-shaped outer member among the pair of guides is shorter than or equal to a predetermined length.

13. An air conditioner comprising:
    a housing configured to form an appearance of the air conditioner and comprising at least one direct-wind outlet to discharge air from an inside to an outside of the air conditioner;
    a heat exchanger positioned inside the housing;
    a fan configured to generate air flow, such that air flows through the heat exchanger and into the air conditioner;
    at least one duct including:
        a first channel forming surface configured to form a basic channel for guiding the blown air, and
        a second channel forming surface configured to form a low wind-speed channel extended from the basic channel;

a porous panel corresponding to the second channel forming surface, the porous panel including a plurality of pores; and a blade configured to swivel between a closed position in which the blade blocks the at the at least one direct-wind outlet of the housing and an open position in which the blade enters into the housing from the at least one direct-wind outlet to open the at least one direct-wind outlet, wherein the first channel forming surface of the at least one duct is configured to orient the basic channel toward a center of the air conditioner, and wherein the second channel forming surface of the duct is configured to orient the low wind-speed channel be extended from the basic channel toward at least one side of the air conditioner.

14. The air conditioner according to claim 13, wherein the blade is configured to:

block the low wind-speed channel at the open position so that the air passed through the basic channel is discharged outside of the air conditioner, direct the air passed through the basic channel to move to the low wind-speed channel at the closed position, and discharge the air to the outside via the plurality of pores at the closed position.

15. The air conditioner according to claim 14, further comprising:

a driver which drives the blade to swivel; and at least one processor configured to control the driver.

16. The air conditioner according to claim 14, wherein the fan is deviated from a center of the air conditioner, and wherein the blade is swiveled to an area opposite to the deviation.

17. The air conditioner according to claim 14, wherein the blade comprises a plate-shaped outer member, and wherein, based on the blade being in the open position, the blade is further configured to swivel in a first direction or a second direction different from the first direction to direct air passed through the basic channel in accordance with swiveled angles of the blade.

18. The air conditioner according to claim 17, wherein the blade comprises an inner member including a pair of guides spaced apart from each other, and wherein the air passed through the basic channel is discharged in the first direction or the second direction while passing through a channel formed by the pair of guides, in accordance with swiveled angles at the open position.

19. The air conditioner according to claim 18, wherein the plate-shaped outer member and the inner member of the blade are formed as a single body.

20. The air conditioner according to claim 18, wherein the plate-shaped outer member and the inner member of the blade at the closed position form a predetermined angle so that at least one of the pair of guides of the inner member is positioned at a center of the basic channel.

* * * * *